US008744618B2

(12) United States Patent
Peters et al.

(10) Patent No.: US 8,744,618 B2
(45) Date of Patent: Jun. 3, 2014

(54) SYSTEMS AND METHODS FOR FACILITATING CONSUMER-DISPENSER INTERACTIONS

(75) Inventors: Dan Peters, Alpharetta, GA (US); Son V. Tran, Alpharetta, GA (US); David R. Newman, Atlanta, GA (US); Leonard F. Antao, Smyrna, GA (US); David O. Slagley, Roswell, GA (US); H. Brock Kolls, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 570 days.

(21) Appl. No.: 12/204,544

(22) Filed: Sep. 4, 2008

(65) Prior Publication Data

US 2009/0069931 A1 Mar. 12, 2009

Related U.S. Application Data

(60) Provisional application No. 60/970,509, filed on Sep. 6, 2007, provisional application No. 60/970,511, filed on Sep. 6, 2007, provisional application No. 60/970,513, filed on Sep. 6, 2007.

(51) Int. Cl.
*G06F 17/00* (2006.01)

(52) U.S. Cl.
USPC ............................ 700/236; 700/242; 700/244

(58) Field of Classification Search
USPC .................................. 700/233, 236, 242, 244
See application file for complete search history.

(56) References Cited

U.S. PATENT DOCUMENTS

| | | | |
|---|---|---|---|
| 3,991,911 | A | 11/1976 | Shannon et al. |
| 4,358,171 | A | 11/1982 | Christen |
| 4,525,071 | A | 6/1985 | Horowitz et al. |
| 4,563,739 | A | 1/1986 | Gerpheide et al. |
| 4,819,176 | A | 4/1989 | Ahmed et al. |
| 5,147,068 | A | 9/1992 | Wright |

(Continued)

FOREIGN PATENT DOCUMENTS

| | | |
|---|---|---|
| BE | 1005369 | 6/1993 |
| CN | 1378432 | 11/2002 |

(Continued)

OTHER PUBLICATIONS

Invitation to Pay Additional Fees and Partial International Search for PCT/US2008/075281 dated Mar. 13, 2009.

(Continued)

*Primary Examiner* — Timothy Waggoner
(74) *Attorney, Agent, or Firm* — Sutherland Asbill & Brennan LLP

(57) ABSTRACT

Embodiments of the invention can include systems and methods for dispensing consumable products. In one embodiment, a system comprising a product dispenser and processor can be provided. The processor can be operable to execute a set of instructions operable to receive a consumer preference to receive a notification associated with a product. The set of instructions can be further operable to determine whether the product is being offered, and based at least in part on the consumer preference, notify the consumer regarding availability of the product from the product dispenser.

23 Claims, 13 Drawing Sheets

(56) References Cited

U.S. PATENT DOCUMENTS 5,225,819 A 7/1993 Hosotani et al.
5,312,017 A 5/1994 Schroeder et al.
5,350,082 A * 9/1994 Kiriakides et al. ................ 221/1
5,358,145 A 10/1994 Smith et al.
5,408,917 A 4/1995 Lussi
5,603,430 A 2/1997 Loehrke et al.
5,615,801 A 4/1997 Schroeder et al.
5,691,684 A 11/1997 Murrah
5,715,700 A 2/1998 Credle, Jr.
5,735,436 A 4/1998 Schroeder et al.
5,798,694 A 8/1998 Reber et al.
5,839,610 A 11/1998 Reese et al.
5,842,603 A 12/1998 Schroeder et al.
5,884,807 A 3/1999 Yun
5,997,924 A 12/1999 Olander, Jr. et al.
6,053,359 A * 4/2000 Goulet et al. ................. 221/221
6,116,460 A 9/2000 Kim et al.
6,119,434 A 9/2000 Andersson
6,131,399 A 10/2000 Hall
6,152,591 A 11/2000 McCall et al.
6,161,059 A 12/2000 Tedesco et al.
6,238,721 B1 5/2001 Knepler
6,317,649 B1 11/2001 Tedesco et al.
6,354,468 B1 3/2002 Riek
6,377,868 B1 4/2002 Gardner, Jr.
6,378,275 B1 4/2002 Andersson
6,424,884 B1 7/2002 Brooke et al.
6,465,035 B1 10/2002 Knepler
6,470,233 B1 10/2002 Johnson, Jr.
6,479,086 B1 11/2002 Knepler
6,564,999 B1 5/2003 Saveliev et al.
6,572,016 B2 6/2003 Saveliev et al.
6,618,062 B1 9/2003 Brown et al.
6,622,064 B2 * 9/2003 Bartholomew et al. ....... 700/233
6,658,323 B2 12/2003 Tedesco et al.
6,688,134 B2 2/2004 Barton et al.
6,698,228 B2 3/2004 Kateman et al.
6,751,525 B1 6/2004 Crisp
6,756,069 B2 6/2004 Scoville et al.
6,759,072 B1 7/2004 Gutwein
6,772,944 B2 8/2004 Brown
6,799,085 B1 9/2004 Crisp
6,807,460 B2 10/2004 Black et al.
6,907,741 B2 6/2005 Kateman
6,918,258 B2 7/2005 Cunha et al.
6,941,858 B2 9/2005 Kateman
6,968,876 B2 11/2005 Yacko et al.
6,973,478 B1 12/2005 Ketonen et al.
6,974,928 B2 * 12/2005 Bloom .......................... 700/243
6,980,886 B2 12/2005 Shimoda et al.
6,980,887 B2 12/2005 Varga et al.
6,982,640 B2 1/2006 Lindsay et al.
6,990,391 B1 1/2006 Cunha et al.
7,009,519 B2 3/2006 Leonard et al.
7,020,680 B2 3/2006 Defosse
7,028,861 B2 4/2006 Sayers et al.
7,031,804 B2 4/2006 Brooke et al.
7,032,818 B2 4/2006 Thomas
7,053,773 B2 5/2006 McGarry et al.
7,065,429 B1 6/2006 McClain et al.
7,082,970 B2 8/2006 Bartholomew et al.
7,147,131 B2 12/2006 Sher et al.
7,151,982 B2 * 12/2006 Liff et al. ...................... 700/241
7,156,259 B2 1/2007 Bethuy et al.
7,161,494 B2 1/2007 Akuzawa
7,223,427 B2 5/2007 Knepler
7,231,279 B2 6/2007 Ghidotti
7,234,609 B2 6/2007 DeLazzer et al.
7,249,050 B1 7/2007 Walker et al.
7,331,483 B2 2/2008 Bhimani et al.
7,353,080 B2 4/2008 Walker et al.
7,387,239 B2 6/2008 Thomas et al.
7,391,318 B2 6/2008 Higashi
7,395,134 B2 7/2008 Bartholomew et al.
7,499,768 B2 * 3/2009 Hoersten et al. .............. 700/236
7,499,769 B2 3/2009 Walker et al.
7,627,496 B2 12/2009 Walker et al.
7,640,755 B1 1/2010 Kateman
7,673,555 B2 3/2010 Nosler et al.
7,912,579 B2 3/2011 Stettes
7,918,368 B2 4/2011 Crisp
8,340,815 B2 12/2012 Peters et al.
2002/0059175 A1 5/2002 Nakano
2002/0065579 A1 5/2002 Tedesco et al.
2002/0077889 A1 6/2002 Kolls
2002/0116261 A1 8/2002 Moskowitz et al.
2002/0123926 A1 9/2002 Bushold et al.
2002/0129712 A1 9/2002 Westbrook et al.
2002/0143626 A1 10/2002 Voltmer et al.
2002/0161653 A1 10/2002 Walker et al.
2002/0183893 A1 12/2002 Brooke et al.
2003/0010791 A1 1/2003 Gentiluomo et al.
2003/0032474 A1 2/2003 Kaminkow
2003/0083758 A1 5/2003 Williamson
2003/0129286 A1 7/2003 Knepler
2003/0191709 A1 10/2003 Elston et al.
2003/0216964 A1 11/2003 MacLean et al.
2004/0044584 A1 3/2004 Chung
2004/0103033 A1 5/2004 Reade et al.
2004/0113786 A1 6/2004 Maloney
2004/0129720 A1 7/2004 Cheng et al.
2004/0226994 A1 11/2004 Brown
2004/0243259 A1 12/2004 Peterson et al.
2005/0003068 A1 1/2005 Kester et al.
2005/0075900 A1 4/2005 Arguimbau
2005/0143857 A1 6/2005 Chirnomas
2005/0167493 A1 8/2005 Barton et al.
2005/0178144 A1 8/2005 Crisp
2005/0178793 A1 8/2005 Cheng et al.
2005/0182599 A1 8/2005 Knepler
2005/0192705 A1 * 9/2005 Pinney et al. ................. 700/241
2005/0205666 A1 9/2005 Ward et al.
2005/0258961 A1 11/2005 Kimball et al.
2005/0276883 A1 12/2005 Jeffrey et al.
2006/0000851 A1 1/2006 Girard et al.
2006/0043101 A1 3/2006 Bhimani et al.
2006/0043111 A1 3/2006 Jennings et al.
2006/0051614 A1 3/2006 Su et al.
2006/0054614 A1 3/2006 Baxter et al.
2006/0081653 A1 4/2006 Boland et al.
2006/0102645 A1 5/2006 Walker et al.
2006/0108415 A1 5/2006 Thomas et al.
2006/0111978 A1 5/2006 Tietzen et al.
2006/0115570 A1 6/2006 Guerrero et al.
2006/0115572 A1 6/2006 Guerrero et al.
2006/0131329 A1 6/2006 Sayers et al.
2006/0144244 A1 7/2006 Girard et al.
2006/0180647 A1 8/2006 Hansen
2006/0192003 A1 8/2006 Chung
2006/0224696 A1 10/2006 King et al.
2006/0247824 A1 11/2006 Walker et al.
2006/0261156 A1 11/2006 Brown
2006/0272922 A1 12/2006 Hoersten et al.
2007/0016852 A1 1/2007 Kim et al.
2007/0027576 A1 2/2007 Juds et al.
2007/0044820 A1 3/2007 Chan et al.
2007/0087756 A1 4/2007 Hoffberg
2007/0124204 A1 5/2007 De Boer et al.
2007/0252709 A1 11/2007 Collins et al.
2007/0299555 A1 12/2007 Walker et al.
2008/0004973 A1 1/2008 Rothschild
2008/0029541 A1 2/2008 Wallace et al.
2008/0051193 A1 2/2008 Kaminkow et al.
2008/0116262 A1 5/2008 Majer
2008/0173705 A1 7/2008 Girard et al.
2008/0201241 A1 8/2008 Pecoraro
2009/0065520 A1 3/2009 Peters et al.
2009/0069930 A1 3/2009 Peters et al.
2009/0069949 A1 3/2009 Carpenter et al.
2009/0070234 A1 3/2009 Peters et al.
2010/0114368 A1 5/2010 Walker et al.
2010/0116842 A1 5/2010 Hecht et al.

(56) References Cited

U.S. PATENT DOCUMENTS

| | | | |
|---|---|---|---|
| 2011/0315711 | A1 | 12/2011 | Hecht et al. |
| 2012/0037008 | A1 | 2/2012 | Rodriguez |
| 2013/0079926 | A1 | 3/2013 | Peters et al. |

FOREIGN PATENT DOCUMENTS

| | | | |
|---|---|---|---|
| DE | 4013147 | | 10/1991 |
| EP | 1165428 | | 7/2003 |
| EP | 1626375 | A1 | 2/2006 |
| EP | 1637055 | | 3/2006 |
| FR | 2624844 | | 6/1989 |
| FR | 2624844 | A | 6/1989 |
| GB | 2416757 | A | 9/2004 |
| JP | 59055597 | | 3/1984 |
| JP | 61288289 | | 12/1986 |
| JP | H05-089329 | | 4/1993 |
| JP | H05-094577 | | 4/1993 |
| JP | H05-128349 | | 5/1993 |
| JP | 11262649 | A | 9/1999 |
| JP | 2000-099822 | | 4/2000 |
| JP | 2001-250161 | | 9/2001 |
| JP | 2001-319026 | | 11/2001 |
| JP | 2002099950 | A | 4/2002 |
| JP | 2002245536 | A | 8/2002 |
| JP | 2002-538561 | | 11/2002 |
| JP | 2003016164 | A | 1/2003 |
| JP | 2003506184 | A | 2/2003 |
| JP | 2003121505 | A | 4/2003 |
| JP | 2003-303372 | | 10/2003 |
| JP | 2003337974 | | 11/2003 |
| JP | 2005089329 | A | 4/2005 |
| JP | 2005094577 | A | 4/2005 |
| JP | 2005276148 | A | 10/2005 |
| JP | 2006309336 | A | 11/2006 |
| JP | 2009-524868 | | 7/2009 |
| RU | 2146102 | | 10/2000 |
| RU | 2297385 | | 4/2007 |
| WO | 9837518 | A1 | 8/1998 |
| WO | 0211087 | A1 | 2/2002 |
| WO | 2083282 | A1 | 10/2002 |
| WO | 2005063091 | | 7/2005 |
| WO | 2005091236 | A1 | 9/2005 |
| WO | 2006101394 | A | 9/2006 |
| WO | 2006101394 | A2 | 9/2006 |
| WO | 2006131431 | A1 | 12/2006 |
| WO | 2007056407 | A2 | 5/2007 |
| WO | 2007070032 | | 6/2007 |
| WO | 2007070032 | A1 | 6/2007 |
| WO | 2007085925 | | 8/2007 |
| WO | 2007127525 | A2 | 11/2007 |
| WO | 2009032911 | A1 | 3/2009 |
| WO | 2009032938 | A2 | 3/2009 |
| WO | 2009032942 | A2 | 3/2009 |
| WO | 2009032946 | A1 | 3/2009 |

OTHER PUBLICATIONS

International Search Report and Written Opinion for PCT/US2008/075235 dated Feb. 4, 2009.
International Search Report and Written Opinion for PCT/US2008/075287 dated Feb. 18, 2009.
International Search Report and Written Opinion for PCT/US2008/075272 dated Apr. 6, 2009.
International Search Report and Written Opinion for PCT/US2008/075277 dated Apr. 24, 2009.
International Search Report and Written Opinion for PCT/US2009/035410 dated Apr. 14, 2009.
International Search Report and Written Opinion for PCT/US2009/035414 dated Mar. 23, 2009.
International Search Report and Written Opinion for PCT/US2009/035407 dated Apr. 28, 2009.
Disclosure Under 37 C.F.R. §1.56 as filed Dec. 22, 2008.
Non-Final Office Action for U.S. Appl. No. 12/204,485 dated Mar. 14, 2011.
Final Office Action for U.S. Appl. No. 12/204,485 dated Jul. 29, 2011.
Non-Final Office Action for U.S. Appl. No. 12/204,505 dated May 12, 2011.
Non-Final Office Action for U.S. Appl. No. 12/204,494 dated Mar. 16, 2011.
Non-Final Office Action for U.S. Appl. No. 12/204,514 dated May 6, 2011.
Non-Final Office Action for U.S. Appl. No. 12/204,531 dated May 13, 2011.
Notification of Transmittal of and the International Preliminary Report on Patentability for International Application No. PCT/US2008/075272 mailed Dec. 29, 2009.
English Language Translation of Office Action of the Formal Examination for Russian Application No. 2010110466 mailed Apr. 29, 2010.
English Language Translation of First Office Action for Russian Application No. 2010110466 mailed Jun. 18, 2012.
Notification of Transmittal of and the International Search Report and Written Opinion for International Application No. PCT/US2008/075263 mailed Mar. 19, 2009.
Notification of Transmittal of and the International Preliminary Report on Patentability for International Application No. PCT/US2008/075263 mailed Jan. 15, 2010.
English Language Translation of Notice of Reasons for Rejection for Japanese Application No. 2010-524145 mailed Feb. 26, 2013.
English Language Translation of First Office Action for Chinese Application No. 200880112042.7 mailed Sep. 28, 2012.
English Language Translation of First Office Action for Chinese Application No. 200880112030 mailed Aug. 23, 2011.
English Language Translation of First Office Action for Chinese Application No. 2008801120450 mailed Nov. 30, 2011.
English Language Translation of First Office Action for Mexican Application No. Mx/a/2010/002216 mailed May 28, 2012.
English Language Translation of First Office Action for Russian Application No. 2010111244 mailed Apr. 26, 2012.
English Language Translation of First Office Action for Russian Application No. 2010111631 mailed Apr. 25, 2012.
English Language Translation of First Office Action for Russian Application No. 2010111632 mailed May 22, 2012.
English Language Translation of Notice of Reasons for Rejection for Japanese Application No. 2010524139 mailed Feb. 22, 2013.
English Language Translation of Notice of Reasons for Rejection for Japanese Application No. 2010524146 mailed Dec. 25, 2012.
English Language Translation of Notice of Reasons for Rejection for Japanese Application No. 2010524149 mailed Dec. 25, 2012.
English Language Translation of Second Office Action for Chinese Application No. 200880112030 mailed May 9, 2012.
English Language Translation of Second Office Action for Chinese Application No. 2008801120450 mailed Oct. 31, 2012.
English Language Translation of the Formal Examination for Russian Application No. 2010111632 mailed May 17, 2010.
English Language Translation of Third Office Action for Chinese Application No. 200880112030 mailed Feb. 5, 2013.
European Communication pursuant to Rules 161(1) and 162 EPC for European Application No. 08799175.8 mailed Jun. 9, 2010.
European Communication pursuant to Rules 161(1) and 162 EPC for European Application No. 0879918.1 mailed Jun. 9, 2010.
European Communication pursuant to Rules 161(1) and 162 EPC for European Application No. 08829051.5 mailed Jun. 15, 2010.
European Communication pursuant to Rules 161(1) and 162 EPC for European Application No. 08829155.4 mailed Jun. 6, 2010.
Examination Report for European Application No. 08829155.4 mailed May 10, 2013.
Examiner's First Report for Australian Application No. 2008296257 mailed Jun. 7, 2012.
Examiner's First Report for Australian Application No. 2008296266 mailed Jun. 14, 2012.
Examiner's First Report for Australian Application No. 2008296269 mailed Jun. 8, 2012.
Examiner's First Report for Australian Application No. 2008296274 mailed Jun. 1, 2012.

(56) References Cited

OTHER PUBLICATIONS

Final Office Action for related U.S. Appl. No. 12/204,494 mailed Mar. 7, 2013.

Final Office Action for related U.S. Appl. No. 12/204,514 mailed Oct. 7, 2011.

Final Office Action for related U.S. Appl. No. 12/204,531 mailed Oct. 19, 2011.

FR2624844; reference cited in International Search Report for International Application No. PCT/US2008/075277 (English language translation is unavailable).

Non-Final Office Action for related U.S. Appl. No. 12/204,494 mailed Jul. 5, 2012.

Non-Final Office Action for related U.S. Appl. No. 12/204,494 mailed Oct. 17, 2011.

Non-Final Office Action for related U.S. Appl. No. 12/204,494 mailed Mar. 16, 2011.

Non-Final Office Action for related U.S. Appl. No. 12/204,494 mailed Oct. 7, 2010.

Notification of Transmittal of and the International Preliminary Report on Patentability for International Application No. PCT/US2008/075287 mailed Jan. 15, 2010.

Non-Final Office Action for related U.S. Appl. No. 12/204,514 mailed Apr. 18, 2012.

Non-Final Office Action for related U.S. Appl. No. 12/204,531 mailed Apr. 6, 2012.

Non-Final Office Action for related U.S. Appl. No. 12/204,531 mailed May 13, 2011.

Non-Final Office Action for related U.S. Appl. No. 13/683,987 mailed Apr. 3, 2013.

Notice of Allowance for related U.S. Appl. No. 12/204,514 mailed Feb. 22, 2013.

Notice of Allowance for related U.S. Appl. No. 12/204,514 mailed Nov. 9, 2012.

Notice of Allowance for related U.S. Appl. No. 12/204,531 mailed Aug. 21, 2012.

Notification of Transmittal of and the International Preliminary Report on Patentability for International Application No. PCT/US2008/075277 mailed Jan. 15, 2010.

* cited by examiner

500

600

700

800

900

1000

1100

1300

1400

1500

1600

SYSTEMS AND METHODS FOR FACILITATING CONSUMER-DISPENSER INTERACTIONS

RELATED APPLICATIONS

This application claims priority to the following applications: U.S. Provisional Ser. No. 60/970,509, entitled "Systems and Methods for Facilitating Consumer-Dispenser Interactions," filed on Sep. 6, 2007; U.S. Provisional Ser. No. 60/970,511, entitled "Systems and Methods for Facilitating Consumer-Dispenser Interactions," filed on Sep. 6, 2007; and U.S. Provisional Ser. No. 60/970,513, entitled "Systems and Methods for Facilitating Consumer-Dispenser Interactions," filed on Sep. 6, 2007, the contents of which are incorporated by reference.

TRADEMARKS

COCA-COLA® is a registered trademark of The Coca-Cola Company, Atlanta, Ga., U.S.A. Other names, symbols, designs, or logos used herein may be registered trademarks, trademarks or product names of The Coca-Cola Company or other companies.

TECHNICAL FIELD

This invention relates to product dispensers, and in particular, relates to systems and methods for facilitating consumer-dispenser interactions.

BACKGROUND OF THE INVENTION

Conventional beverage dispensers can pour a beverage by combining a syrup, sweetener, and/or water. To create a finite variety of beverage selections different kinds of syrup can be offered. This typically results in being able to offer a finite number of branded and non-branded beverage selections. As an example, a single prior art dispenser using several different kinds of syrup might be able to offer limited choices of COCA-COLA™, DIET COCA-COLA™, SPRITE™, and a few other branded or non-branded beverage selections.

One problem with these types of conventional beverage dispensers is that only a limited number of drinks can be offered. As such, conventional beverage dispensers may be limited in being able to offer consumers what they want. In this regard, consumers want a wider menu of beverage selections and the ability to customize their beverage. Research suggests that they want more beverage variations even for a traditional branded beverage. For example, offering COCA-COLA™, COCA-COLA™ with lime, CHERRY COCA-COLA™, VANILLA COCA-COLA™ and numerous other types of COCA-COLA™ beverage variations. Offering all the variations possible for a single drink brand such as COCA-COLA™ is impractical in conventional beverage dispensers in part because conventional beverage dispensers have limited capacity and selection capability. They may not offer the consumer what the consumer wants, that is, a complete variety of choices for all types of branded and non-branded beverages.

SUMMARY OF THE INVENTION

Some or all of the above needs and/or problems may be addressed by embodiments of the invention. Certain embodiments of the invention can include systems and methods for facilitating consumer-dispenser interactions. In one embodiment, a system comprising a product dispenser and processor can be provided. The processor can be operable to execute a set of instructions operable to receive a consumer preference to receive a notification associated with a product. The set of instructions can be further operable to determine whether the product is being offered, and based at least in part on the consumer preference, notify the consumer regarding availability of the product from the product dispenser.

In another embodiment, a method of interacting with a consumer regarding availability of a product can be provided. The method can include receiving a consumer preference to receive a notification associated with a product. In addition, the method can include determining whether the product is being offered. Furthermore, the method can include notifying the consumer regarding availability of the product based at least in part on the consumer preference.

In yet another embodiment, a method of interacting with a consumer regarding a product associated with a product dispenser can be provided. The method can include receiving selection data from a consumer. Based at least in part on the selection data, the method can determine at least one notification to transmit to the consumer. In addition, the method can include transmitting a notification to the consumer.

In another embodiment, a method for marketing a product to consumers can be provided. The method can include receiving a plurality of consumer preferences from a respective plurality of consumers, wherein at least some of the consumer preferences are associated with a preference to receive a notification associated with a product. In addition, the method can include notifying at least a portion of the consumers that the product will be available at a predefined time. Furthermore, the method can include instructing a plurality of product dispensers to dispense the product at the predefined time.

Additional systems, methods, dispensers, features and aspects can be realized through the techniques of various embodiments of the invention. Other embodiments and aspects of the invention are described in detail herein and are considered a part of the claimed invention. Other aspects and features can be understood with reference to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and aspects of the invention are apparent from the following detailed description taken in conjunction with the accompanying drawings in which:

The detailed description explains various example embodiments of the invention, together with aspects and features, with reference to the drawings.

DETAILED DESCRIPTION OF EMBODIMENTS OF THE INVENTION

As used herein, the terms "beverage dispenser", "product dispenser", "beverage product dispenser", "dispenser apparatus", and "dispenser" refer to a device which dispenses a product such as a beverage, can, bottle, or container.

As used herein, the terms "product" and "beverage", and their pluralized forms, are used synonymously, and embodiments of the invention should not be limited in scope by the use of either term.

Figure 1:
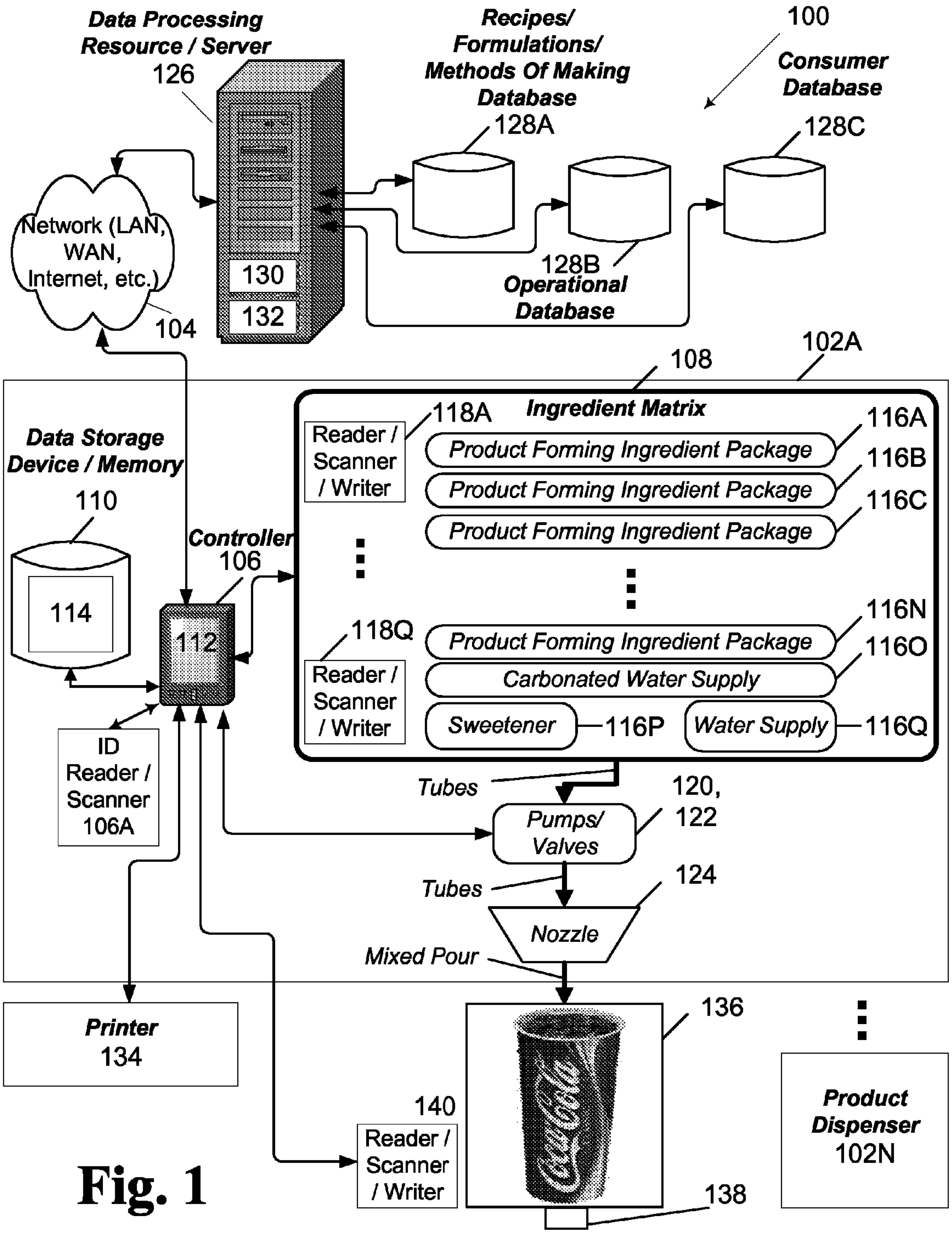
FIG. 1 illustrates an example of a system including a product dispenser and associated network in accordance with an embodiment of the invention.

Turning now to the drawings in greater detail, an example system 100 for a product dispenser according to an embodiment of the invention is shown in FIG. 1. The example system, such as 100, can operate with a networked computer environment which includes at least one network in communication with a product dispenser. For example in FIG. 1, a product dispenser, such as 102A, is shown in communications with a communications network, such as 104. In this embodiment, at least one of the product dispensers, such as 102A, can interface with a consumer, customer, or other user. Other example environments or systems for a product dispenser according to an embodiment of the invention may include non-network configurations.

The example product dispenser 102A shown in FIG. 1 can be a client-type device. Each product dispenser, such as 102A-102N, can be a computer or processor-based device capable of communicating with the communications network, such as 104, via a signal, such as a wireless frequency signal or a direct wired communication signal.

Each product dispenser, such as 102A, can include a processor or controller 106, an identification reader/scanner device 106A, an ingredient matrix 108, a computer-readable medium, such as a random access memory (RAM) 110, coupled to the processor or controller 106, and an input/output device, such as display device 112. The processor or controller, such as 106, can execute computer-executable program instructions stored in memory, such as 110. Computer executable program instructions stored in memory, such as 110, can include any number of module application programs, such as a consumer interaction engine or module 114. The consumer interaction engine or module, such as 114, can be adapted to implement various methods for consumer-dispenser interactions. In addition, a consumer interaction engine or module, such as 114, can be adapted to receive one or more signals from one or more consumers, remote and/or local servers or data processing resources, and client-type devices or wireless communication devices. For example, a consumer interaction module executing at a product dispenser, such as 102A, can interact with another consumer interaction module executing at a server, such as 126, to execute or otherwise facilitate any set of instructions in accordance with embodiments of the invention. Other examples of functionality and aspects of embodiments of a consumer interaction engine or module, such as 114, are described below.

The identification reader/scanner device 106A shown in FIG. 1 can be in communication with the controller 106, and can receive or otherwise obtain identification information from any number of devices or means associated with a consumer. For example, an identification reader/scanner device, such as 106A, can include a machine readable code technology such as bar code, or may include any wireless communication technology such as RFID, reflected light frequency, optical, etc.

As shown in FIG. 1, the processor or controller, such as 106, can be in communication with an ingredient matrix, such as 108, to control, monitor, and track the addition, flow, and removal of some or all of the ingredients to or from the matrix 108. An ingredient matrix can be, for example, a series of receptacles or mountings capable of receiving or mounting to a respective product ingredient package or other product ingredient supply. For example, a product ingredient package, such as 116A, can be manufactured as a pouch of liquid secured in a plastic ridged container to allow insertion into an ingredient matrix, such as 108. When inserted into the ingredient matrix, such as 108, the package, such as 116A, or pouch can be pierced by at least one associated fitting which allows the liquid in the package, such as 116A, or pouch to be pumped or otherwise metered by the controller, such as 106, or the matrix, such as 108, and associated equipment in precise ratios to form the desired product, such as a beverage. In one embodiment, one or more product ingredient packages, such as 116A-116Q can be inserted into an ingredient matrix, such as 108. The ingredient matrix 108 in this embodiment can secure some or all of the product ingredient packages, such as 116A-116Q. In one embodiment, one or more product packages, such as 116O, 116P, 116Q may be direct supplies rather than packages. For example, a product package, such as 116O, can be a continuous supply of carbonated water provided from a carbonated water source; a product package, such as 116P, can be a sweetener provided from a sweetener source such as a non-nutritive sweetener (NNS) or high fructose corn syrup (HFCS); and a product package, such as 116Q, can be a continuous supply of water from a tap, purified, or distilled water source. In any embodiment, ingredients, components, or product additives may be in the form of a pouch, or may be in another configuration suitable for access by the ingredient matrix, such as 108.

In the embodiment shown in FIG. 1, a product dispenser, such as 102A, with an ingredient matrix, such as 108, can include one or more machine readable code readers, such as 118A-118Q, utilizing a machine readable code technology such as bar code, RFID, reflected light frequency, optical, etc. In one embodiment, at least one machine readable code reader, such as 118A-118Q, can be associated with a location associated with an ingredient matrix, such as 108, wherein some or all of the product ingredient packages, such as 116A-116Q, can be scanned, read, or otherwise identified prior to insertion into or connection with the ingredient matrix, such as 108. In this regard, the processor or controller, such as 106, can receive or obtain information related to some or all of the product ingredient packages, such as 116A-116Q, and use such information to identify within the ingredient matrix, such as 108, an optimum or other desired location within the ingredient matrix, such as 108, for placement of the product ingredient package, such as 116A. For example, data from a product ingredient package, such as 116A, can be read, scanned, or identified from a serial number or identification code associated with the product ingredient package, such as 116A. Such data can be utilized alone or correlated with previously stored information in at least one database, such as 128A-128C described below, or with data otherwise accessible or stored by a data processing resource or server, described below as 126, which may identify one or more ingredients associated with the product ingredient package, such as 116A. In another example, data from a product ingredient package, such as 116A, can be an ingredient code or identifier, and can be utilized alone or correlated with previously stored information in a database, such as 128A-128C, or with data otherwise accessible or stored by a data processing resource or server, such as 126, which may identify one or more ingredients associated with the product ingredient package, such as 116A.

In the embodiment shown in FIG. 1, a product dispenser, such as 102A, with an ingredient matrix, such as 108, can include one or more pumps and/or valves, such as 120 and 122 respectively, and a nozzle, such as 124. In this example, each of the pumps, such as 120, and valves, such as 122 can be controlled by the product dispenser, such as 102A. For instance, the processor or controller, such as 106, can be in communication with some or all of the pumps 120 and valves 122. In this regard, some or all of the pumps, such as 120, and/or valves, such as 122, can be selectively operated by the processor or controller, such as 106, to pump, meter, or otherwise obtain respective product products or ingredients from certain of the product ingredient packages, such as 116A-116Q, to dispense a custom beverage.

In one embodiment, an ingredient matrix, such as 108, can have multiple product ingredient packages, such as 116A-116Q, inserted into it, wherein each package may contain a different or unique ingredient. By way of one or more commands or instructions from a processor or controller, such as 106, to one or more pumps, such as 120 and/or valves, such as 122, associated with the ingredient matrix, such as 108, varying ratios of ingredients from some or all of the product ingredient packages, such as 116A-116Q, can be selectively combined to form various types of products, such as beverages. Example ingredients can include, but are not limited to, a flavoring, a concentrate, a syrup, a sweetener, water, carbonated water, a lime flavoring, a vanilla flavoring, a cherry flavoring, and any ingredient part of a branded or non-branded drink, such as CHERRY COCA-COLA™, VANILLA COCA-COLA™, COCA-COLA™, DIET COCA-COLA™, and FANTA™.

In one embodiment, one or more of the product ingredient packages, such as 116A-116Q, may contain ingredients referred to as "pungent," which may limit their placement within an ingredient matrix, such as 108. Pungent-type ingredients can be relatively strong such that once a pungent ingredient is pumped or otherwise drawn through a particular portion of a product dispenser, such as 102A, any associated path through the product dispenser 102A, such as tubing in the product dispenser 102A, may be permanently flavored and any subsequent ingredient or fluid that is pumped or drawn through the path or tubing may be tainted with the taste of the pungent-type ingredient. As such, once a pungent-type ingredient is used in an ingredient matrix, such as 108, an associated processor or controller, such as 106, can track or otherwise store information that controls or limits the replacement and/or addition of other pungent ingredients to certain locations of the ingredient matrix, such as 108, to avoid mixing pungent-type ingredients or tainting non-pungent ingredients in order to maintain product or beverage quality.

In another embodiment, one or more product ingredient packages, such as 116A-116Q, may require agitation to keep the associated ingredients sufficiently mixed. In such instances, the location of such ingredients in an ingredient matrix, such as 108, can be limited to locations within the ingredient matrix, such as 108, that can be agitated as may be required and/or desired in a particular embodiment.

In another embodiment, ingredients from one or more of product ingredient packages, such as 116A-116Q, may be dispensed through antimicrobial-type tubing and/or dispenser parts. Such ingredients can include, but are not limited to, milk, dairy, soy, and/or other types and kinds of product ingredient packages. In these instances, the location of such ingredients in an ingredient matrix, such as 108, can be limited to locations within the ingredient matrix 108 that utilize suitable antimicrobial-type tubing and/or dispenser parts as may be required and/or desired in a particular embodiment.

In yet another embodiment, a one-to-one relationship can be established between a particular product ingredient package, such as 116A, and at least one pump and/or valve, such as 120 and/or 122 respectively. In some instances, utilizing more than one pump and/or valve for a single product ingredient package, such as 116A, can draw a relatively higher volume of an ingredient from the package, such as 116A, in a relatively shorter period of time. For example, a product ingredient package containing a sweetener, such as sweetener 116P, may utilize more than one pump and/or valve to draw a relatively higher volume of an ingredient from the package 116P in a relatively shorter period of time.

Returning to FIG. 1, any number of other product dispensers, such as 102A-102N, can also be in communication with the network, such as 104. In one embodiment, the communications network, such as 104 shown in FIG. 1, can be a local area network (LAN). In another embodiment, a communications network can be a wireless communications network capable of transmitting both voice and data signals, including image data signals or multimedia signals. Other networks can include, but are not limited to, Internet, a local area network (LAN), a wide area network (WAN), a LON WORKS network, a wired network, a wireless network, or any combination thereof.

The network, such as 104 of FIG. 1, is also shown in communication with at least one data processing resource, such as a server 126, and at least one database, such as 128A. In this embodiment, a server such as 126 can be a processor-based device capable of communicating with some or all of the product dispensers, such as 102A-102N, via the communications network, such as 104, by way of a signal, such as a wireless frequency signal or a direct wired communication signal. In addition, a data processing resource or server, such as 126, can be used to aid or facilitate recipes, formulations, methods of making products or beverages, provide operational data processing, perform data processing related to consumer interaction, and/or perform other data processing as may be required and/or desired in a particular embodiment. Such operational data processing can include, for example and not as a limitation, equipment status, maintenance, service alerts, predictive restock, and/or other types and kinds of operational data processing as may be required and/or desired in a particular embodiment. Such consumer interaction support can include, for example and not as a limitation, consumer preferences, consumer product or beverage preferences, loyalty, gaming, prizes, media content, customizations, and/or other types and kinds of consumer interaction and/or data processing support as may be required and/or desired by a particular embodiment.

The server, such as 126 in FIG. 1, can include a processor, such as 130, and a computer-readable medium, such as a random access memory (RAM) 132, coupled to the processor 130. The processor, such as 130, can execute computer-executable program instructions stored in memory, such as 132. Computer executable program instructions stored in memory, such as 132, can include any number of module application programs, such as a consumer interaction engine or module similar to 114. The consumer interaction engine or module similar to 114 can be adapted to implement various methods for consumer interaction. In addition, a consumer interaction engine or module similar to 114 can be adapted to interact with one or more consumers, and one or more servers or data processing resources. Other examples of functionality and aspects of embodiments of a consumer interaction engine or module similar to 114 are described below.

Through the network, such as 104 in FIG. 1, some or all of the product dispensers, such as 102A-102N, can retrieve, receive, or otherwise access information stored in some or all of the databases, such as a recipes, formulations, and methods of making beverages database, such as 128A, operational database, such as 128B, and consumer database, such as 128C. In any instance, one or more of the databases can include product or beverage formation information such as one or more product or beverage recipes, formulations, and methods of making products or beverages. Such product or beverage recipes, formulations, and methods of making products or beverages can include an ingredient list, the ratio of each ingredient, a listing of how a product or beverage can be customized by a consumer, and/or other types and kinds of product or beverage recipes, formulations, and methods of making a product or beverage as may be required and/or desired by a particular embodiment.

The example environment or system 100 shown in FIG. 1, can facilitate customer, consumer, and user interaction with a product dispenser and network. For example and not as a limitation, a user such as a consumer can make a beverage type selection at a product dispenser, such as 102A, by way of an input/output device, such as display device 112. An associated processor or controller, such as 106, can facilitate a user's selection via display device, such as 112, of a particular recipe to form a selected product, such as a beverage. The processor or controller, such as 106, can display one or more products or beverages for selection via the display device, such as 112. The user may select at least one of the products or beverages using the display device, such as 112, for instance, pressing a button provided by or associated with the display device, such as 112. The processor or controller, such as 106, may obtain from a local memory, such as 110, or may communicate via a network, such as 104, with at least one database, or may communicate with at least one data processing resource, such as server 126, to obtain corresponding ingredients and/or ratio of ingredients for forming the selected product or beverage. The processor or controller, such as 106, can utilize the information to operate one or more pumps, such as 120, and/or valves, such as 122, to form and dispense a product or beverage by way of a nozzle, such as 124, into a cup or other container, such as 136.

In another example, a user such as a customer or package installation personnel can facilitate scanning or reading one or more product ingredient packages, such as 116A-116Q, when the packages 116A-16Q are inserted within an ingredient matrix, such as 108, associated with a product dispenser, such as 102A. A processor or controller, such as 106, associated with the product dispenser, such as 102A, can identify an optimum or selected location within the ingredient matrix, such as 108. The user, customer, or package installation personnel can be informed where a particular product ingredient package, such as 116A, is to be located in the ingredient matrix, such as 108, by way of an input/output device, such as display device, such as 112. An example of a display device can include, but is not limited to, a light emitting diode (LED) display indicator, LCD screen, input/output (I/O) interface, audio interface or other types and kinds of displays or indicators as may be required and/or desired in a particular embodiment.

In one embodiment, insertion of a particular product ingredient package, such as 116A, within an ingredient matrix, such as 108, can be checked or otherwise verified by scanning a machine readable code on the respective package, such as 116A, and scanning a machine readable code located on the ingredient matrix, such as 108, at the point of insertion (illustrated as 118A). In this regard, an associated processor or controller, such as 106, can check or verify that the product ingredient package, such as 116A, is correctly located within the ingredient matrix, such as 108.

In another embodiment, a cup, such as 136, or other container can include identification information, such as an RFID or other machine readable tag, such as 138, mounted to the cup as shown in FIG. 1. In some embodiments, identification information can be associated with a consumer by way of, for instance, RFID or other machine readable tag, similar to 138, embodied in or otherwise mounted to an icon or other object. A reader, such as an RFID or other machine readable code reader, such as 140, associated with a product dispenser, such as 102A, can receive or otherwise obtain the identification information from the RFID or other machine readable tag, similar to 138. As shown in FIG. 1, a processor or controller, such as 106, associated with the product dispenser, such as 102A, can be in communication with the RFID or other machine readable code reader, such as 140, and some or all identification information obtained from the RFID or other machine readable tag, such as 138, can be stored or otherwise processed by the processor or controller, such as 106. In this embodiment, the identification information can be embodied in a machine readable code, a bar code, RFID, radio frequency, infrared, or other wireless communication methods or devices, or other types and kinds of coding and/or storage technologies as may be required and/or desired in a particular embodiment. The RFID reader or machine readable code reader, such as 140, can be a corresponding device to read or receive the identification information from the RFID or other machine readable tag, such as 138, and can include an RFID read/write device, an infrared device, a magnetic card reader, a bar code reader, or other suitable reader or receiver technologies as may be required and/or desired in a particular embodiment.

In yet another embodiment, a server or transaction processing resource, such as 126, can facilitate a payment or payment processing when a consumer selects and attempts to pay for a product, such as a beverage, at a product dispenser, such as 102A. An associated processor or controller, such as 106, can receive the consumer's payment or related information by way of, for instance, a display device, such as 112, data transmission, or other input, before, during, or after the selection of the particular product or beverage. In any instance, the processor or controller, such as 106, can transmit the payment or related information to the server or transaction processing resource, such as 126, via a network, such as 104. The server or transaction processing resource, such as 126, may access least one database, such as 128A-128C, or may communicate with at least one other data processing resource to authorize or otherwise validate a payment or related information prior to accepting a payment from the consumer or otherwise dispensing the selected product or beverage to the consumer.

Figure 2:
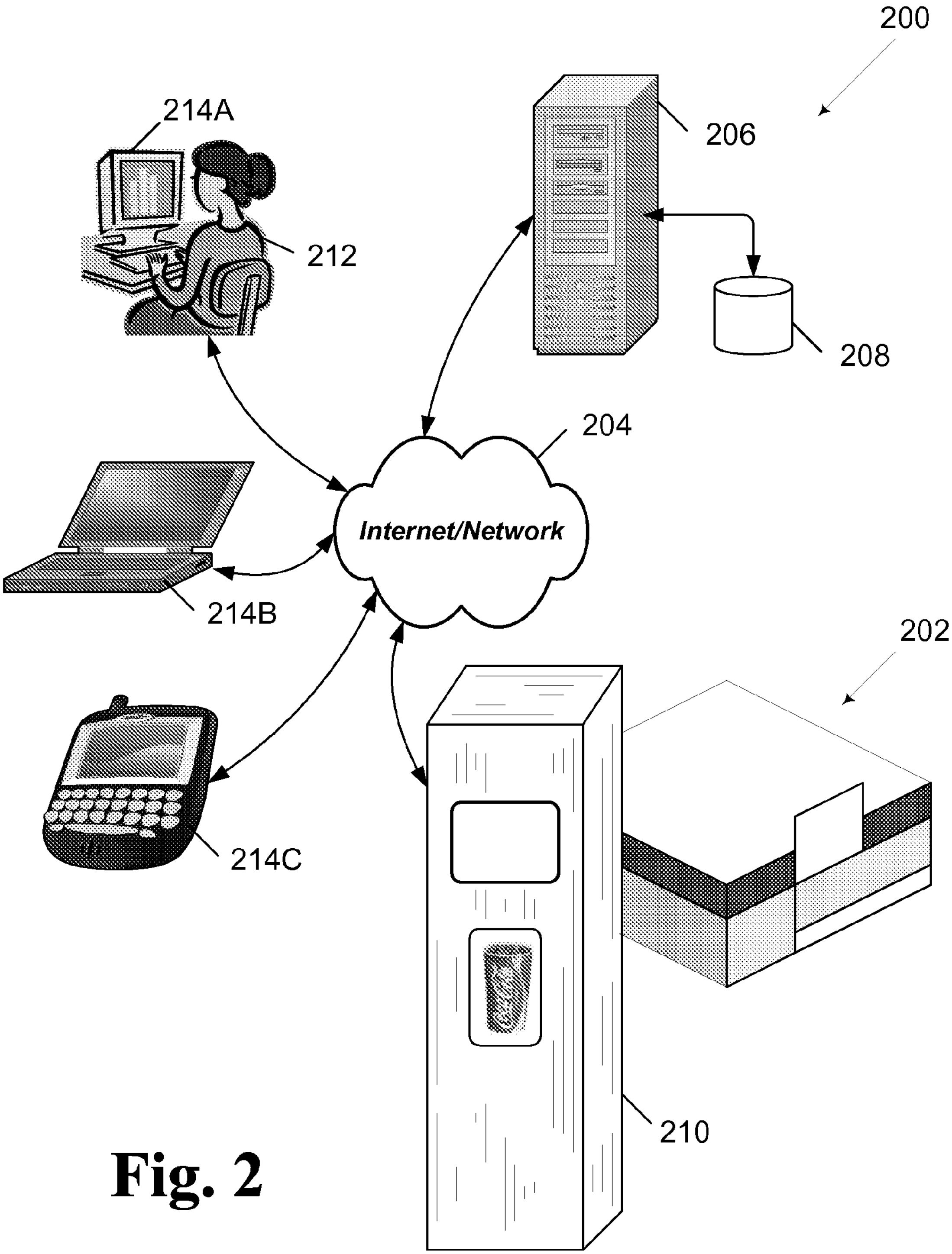
FIG. 2 illustrates one example of a consumer refreshment network in accordance with an embodiment of the invention.

Referring to FIG. 2, an example consumer refreshment environment or system 200 is illustrated. In one embodiment, one or more networked product dispensers, such as 210, can be installed in a plurality of respective locations, such as location 202, and can be in communication via a network 204, such as the Internet or a global network, with one or more servers or data processing resources such as 206, and one or more data storage devices, such as database 208. By way of example, a product dispenser 210 can be similar to a product dispenser or dispenser apparatus described as 102A in FIG. 1. In one example, a product dispenser, such as 210, can include some or all of the following components as described in FIG. 1: an ingredient matrix, such as 108, with locations operable to receive one or more product ingredient packages, such as 116A-116Q, a controller, such as 106, one or more package insertion detection devices or RFID reader/writers, such as 118A-118Q, pumps, such as 120, valves, such as 122, and a nozzle, such as 124. By way of further example, servers or data processing resources 206 can be similar to the server or data processing resource 126 described in FIG. 1.

In one embodiment, one or more consumers, such as 212, can access a network, such as 104, or a consumer refreshment network, such as 204. Through the network 204, a consumer, such as 212, can sign up, configure consumer preferences, access respective accounts, receive promotions, manage loyalty accounts, and/or sign up for other types and kinds of opportunities and services as may be required and/or desired in a particular embodiment. In at least one embodiment, a consumer, such as 212, can choose to access a consumer refreshment network system, such as 200, and/or the product dispenser, such as 210, by way of any number of client-type devices including, but not limited to, a personal computer (PC), such as 214A, a data processing device, such as 214B, a wireless communication device, such as 214C, and/or by way of other types and kinds of data processing, processor-based, or client-type devices. An example of a wireless communication device 214C can include, but is not limited to, a wireless data processing device, a wireless phone, an IPHONE™, an IPOD™, a personal data assistant, and/or a POCKET PC™.

Figure 3:
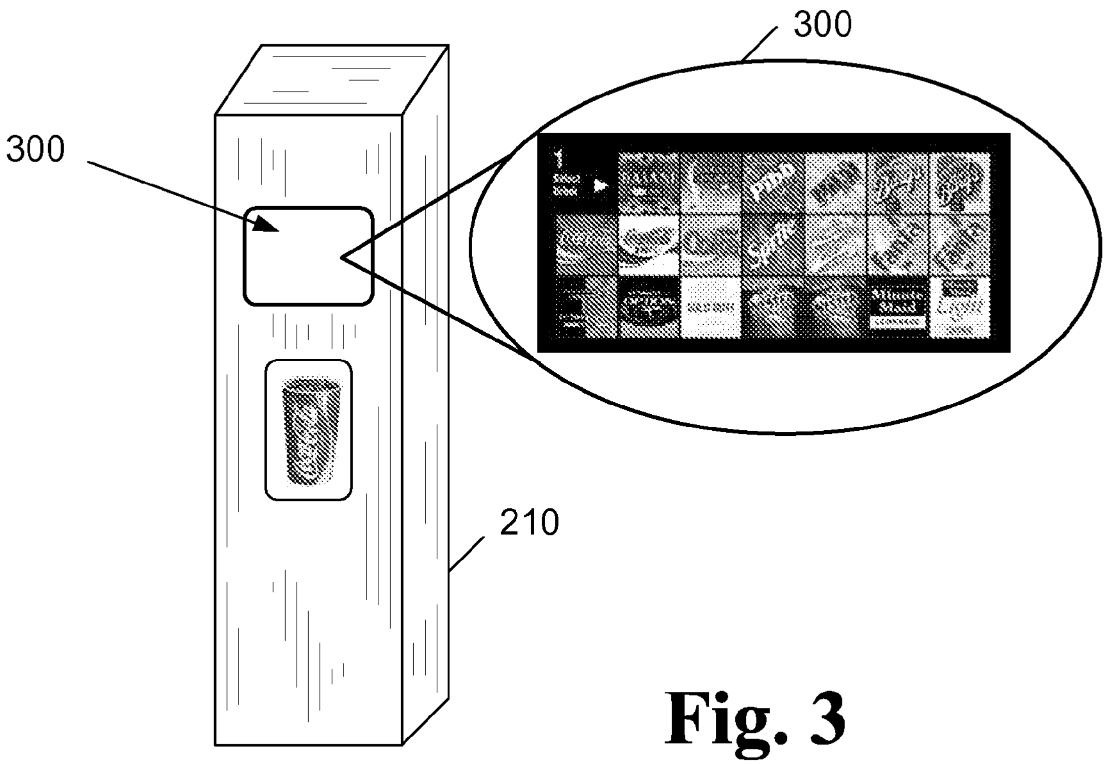
FIG. 3 illustrates one example of an enhanced view graphical user interface in accordance with an embodiment of the invention.

Referring to FIG. 3, an example of an enhanced view graphical user interface 300 is illustrated. In one embodiment, a product dispenser, such as 210 in FIG. 2, can include at least one user interface such as an enhanced view graphical user interface, such as 300, or a consumer interface. The user interface, such as 300, can be used, for instance, by a consumer, such as 212, to select any number of different product or beverage types, kinds, and formulations. In use, a product dispenser, such as 210, with an enhanced view graphical user interface, such as 300, can provide a consumer with selectable product or beverage options in a series of dynamically generated menus, wherein the consumer can locate and select a specific brand, kind, type, and/or formulation of a desired corresponding product or beverage. Once a particular product or beverage option is selected, the consumer can cause a corresponding product or beverage to be formulated and dispensed by the product dispenser.

Figure 4:
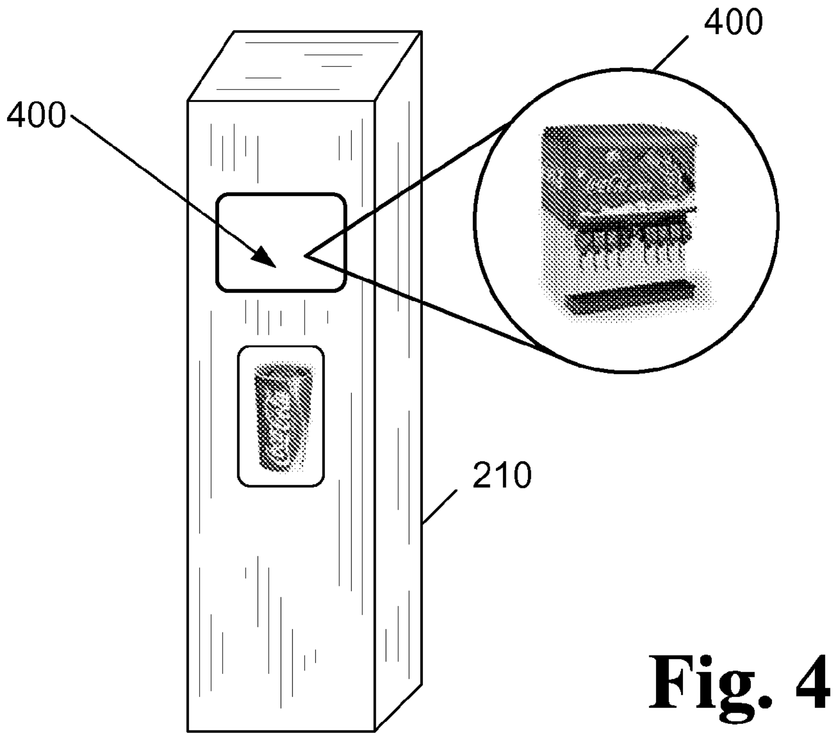
FIG. 4 illustrates one example of a classic view graphical user interface in accordance with an embodiment of the invention.

Referring to FIG. 4, another example of a user interface is shown. In one embodiment, a product dispenser, such as 210 in FIG. 2, can include a classic type graphical user interface, such as 400. The user interface, such as 400, can be used by a consumer, such as 212, to select from a limited number of different product or beverage types, kinds, and/or formulations. In use, a consumer, such as 212, can more easily select a product or beverage from a limited number of product or beverage choices. Once a particular product or beverage option is selected, the consumer can cause a corresponding product or beverage to be formulated and dispensed by the product dispenser. In some embodiments, a classic type graphical user interface can also be referred to as a traditional view as it generally resembles a traditional fountain dispensing valve design. As such, a classic type graphical user interface can be referred to as a traditional view graphical user interface.

In one embodiment, a consumer may desire fewer product or beverage choices than displayed by a product dispenser that allows the selection of, for instance, a plurality of different kinds of products or beverages. In such instances, a classic view graphical user interface with relatively fewer, more traditional product or beverage choices, and including one or more traditional-type product or beverage choices, can be displayed to facilitate, sometimes quicker, consumer interaction with the product dispenser.

In another embodiment, a consumer may elect to create consumer preferences that tailor the types and/or kinds of brands and/or product or beverage formulations displayed in a user interface, such as a classic view graphical user interface, essentially creating a consumer customized classic view graphical user interface. In this particular embodiment, a consumer can create a consumer customized classic view graphical user interface. For example, when a consumer identifies himself or herself to a product dispenser, such as 210, one or more consumer preferences can be retrieved by the product dispenser 210. Based at least in part on one or more consumer preferences, the product dispenser 210 can display a default user interface to the consumer, which may be an enhanced view graphical user interface, a classic view graphical user interface, or a consumer customized classic view graphical user interface.

FIGS. 5-16 are example flowcharts for various methods in accordance with embodiments of the invention. Some or all of the illustrated methods can be implemented by a system, network, product dispenser, or any combination of associated components as shown in FIGS. 1-4.

Figure 5:
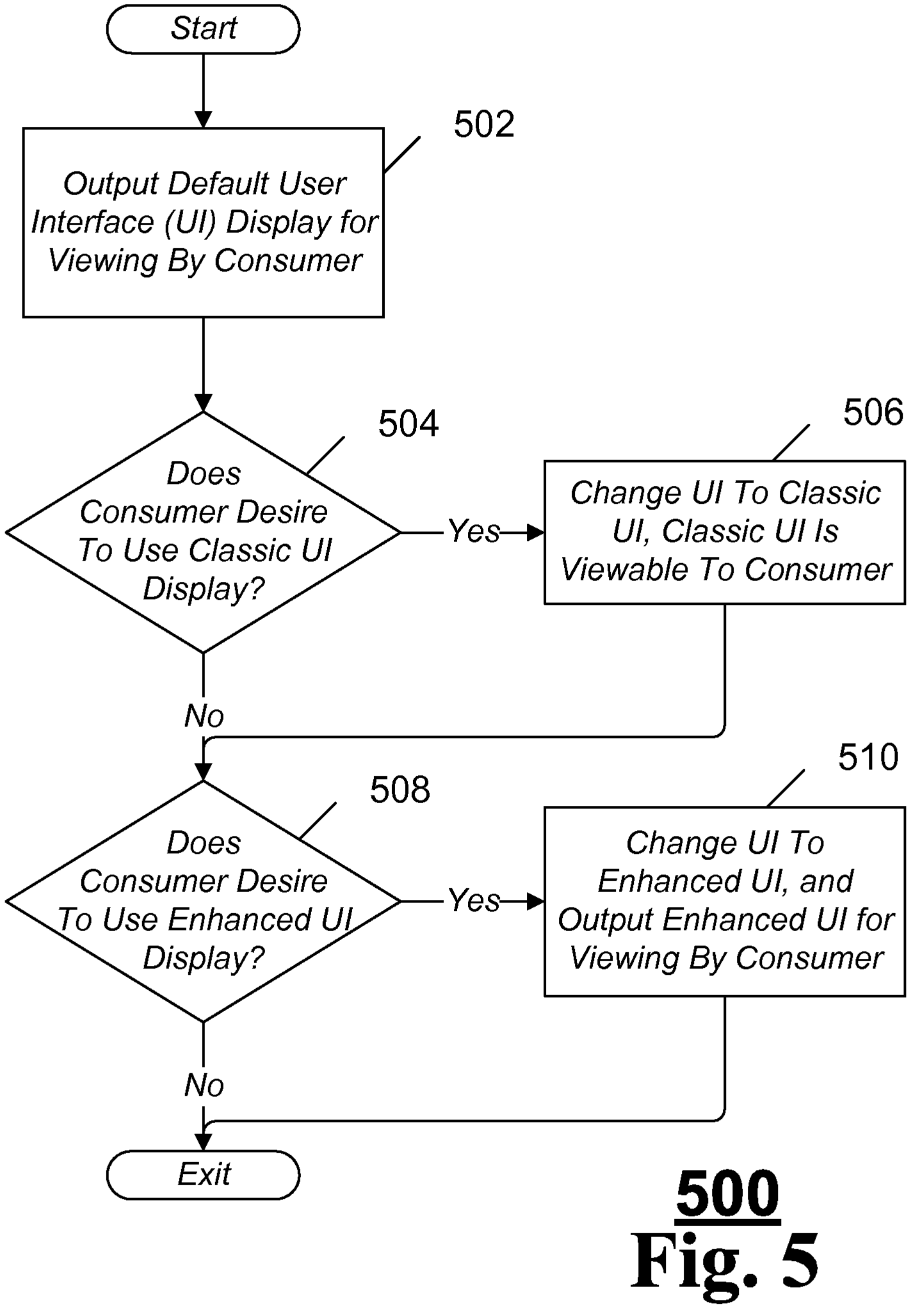
FIG. 5 illustrates an example method of transitioning between an enhanced product dispenser consumer interface and a classic product dispenser consumer interface in accordance with an embodiment of the invention.

Referring to FIG. 5, an example method 500 of transitioning between interfaces for product dispensers is illustrated. For instance, a product dispenser can be operable to dispense hundreds of differently formulated beverages by way of an enhanced graphical user interface view. In some instances, such a number of beverage options may be difficult for all consumers to navigate to the beverage they desire quickly and easily. The product dispenser can provide the consumer with the ability to toggle between the enhanced graphical user interface view and a classic-type view showing major beverage brands, such as COCA-COLA™, DIET COCA-COLA™, SPRITE™, FANTA™, etc. In this regard, the consumer can select a beverage from either the enhanced graphical user interface view or the classic graphical user interface view depending on the user's selection of a particular graphical user interface view.

The method 500 begins in at block 502. In block 502, a default graphical user interface (enhanced or classic) is output or displayed for viewing by a consumer. In the embodiment shown in FIG. 5, a product dispenser, such as 102A in FIG. 1, can initially display a default graphical user interface to a consumer, such as 212 in FIG. 2, by way of a user interface, such as 112. The default graphical user interface can be either an enhanced graphical user interface, such as 300 in FIG. 3, or a classic graphical user interface, such as 400 in FIG. 4. In any instance, the user interface and default graphical user interface are viewable by a consumer.

Block 502 is followed by decision block 504, in which a determination is made as to whether the consumer desires to use the classic view graphical user interface. If the determination is in the affirmative, that is, the consumer desires to use the classic view graphical user interface, then the method 500 continues at block 506. If the determination is in the negative, that is, the consumer does not want to use the classic graphical user interface, then the method 500 continues at decision block 508. In the embodiment shown in FIG. 5, a processor or controller, such as 106 or 206, associated with the product dispenser, such as 102A, can determine whether the consumer desires to use the classic graphical user interface, such as 400. For example, the processor or controller, such as 106 or 206, can receive a consumer input, or may otherwise utilize previously entered or collected consumer data or data associated with the consumer. In another example, previously entered or collected consumer data or data associated with the consumer can be used by a processor or controller, such as 106 or 206, to determine a preferred user interface. In any instance, based at least in part on the consumer input, previously entered or collected consumer data or data associated with the consumer, the processor or controller, such as 106 or 206, can make a determination.

In block 506, the user interface is changed to output or display a classic view graphical user interface. In the embodiment shown in FIG. 5, the processor or controller, such as 106 or 206, can modify the user interface, such as 112, to display the classic view graphical user interface, such as 400. In this manner, the classic view graphical user interface can be viewed by the consumer. The method 500 continues at decision block 508.

In decision block 508, a determination is made as to whether the consumer desires to use the enhanced view graphical user interface. If the determination is in the affirmative, that is, the consumer desires to use the enhanced view graphical user interface, then the method 500 moves to block 510. If the determination is in the negative, that is, the consumer does not want to use the enhanced view graphical user interface, then the method 500 ends. In the embodiment shown in FIG. 5, a processor or controller, such as 106 or 206, associated with the product dispenser, such as 102A, can determine whether the consumer desires to use the enhanced view graphical user interface, such as 300. For example, the processor or controller, such as 106 or 206, can receive a consumer input, or may otherwise utilize previously entered or collected consumer data or data associated with the consumer. In another example, previously entered or collected consumer data or data associated with the consumer can be used by a processor or controller, such as 106 or 206, to determine a preferred user interface. In any instance, based at least in part on the consumer input, previously entered or collected consumer data or data associated with the consumer, the processor or controller, such as 106 or 206, can make a determination.

In block 510, the user interface is changed to output or display an enhanced view graphical user interface. In the embodiment shown in FIG. 5, the processor or controller, such as 106 or 206, can modify the user interface, such as 112, to display the enhanced view graphical user interface, such as 300. In this manner, the enhanced view graphical user interface can be viewed by the consumer. After block 510, the method 500 ends.

In one embodiment, a consumer can select a finite number of products or beverages he or she may prefer. The consumer selections and associated data can be stored by a product dispenser as consumer preferences. Each time a product dispenser identifies a particular consumer, the consumer preferences can be stored in and retrieved by a server or data processing resource, such as 126 or 206, either locally and/or remotely. As requested by a consumer, or based at least in part on some or all of the consumer preferences, the server or data processing resource, such as 126 or 206, can facilitate viewing by the consumer of the enhanced view graphical user interface display, the classic view graphical user interface display, or another customized view user interface display via a user interface, such as 112, associated with the product dispenser.

In one embodiment, a consumer can transmit data or data can otherwise be received from the consumer by a product dispenser. Based at least in part on the data, one or more consumer preferences can be determined by a server or data processing resource, such as 126 or 206. Based at least in part on the consumer preferences, the server or data processing resource, such as 126 or 206, can facilitate viewing by the consumer of the enhanced view graphical user interface display, the classic view graphical user interface display, or another customized view user interface display via a user interface, such as 112, associated with the product dispenser.

Figure 6:
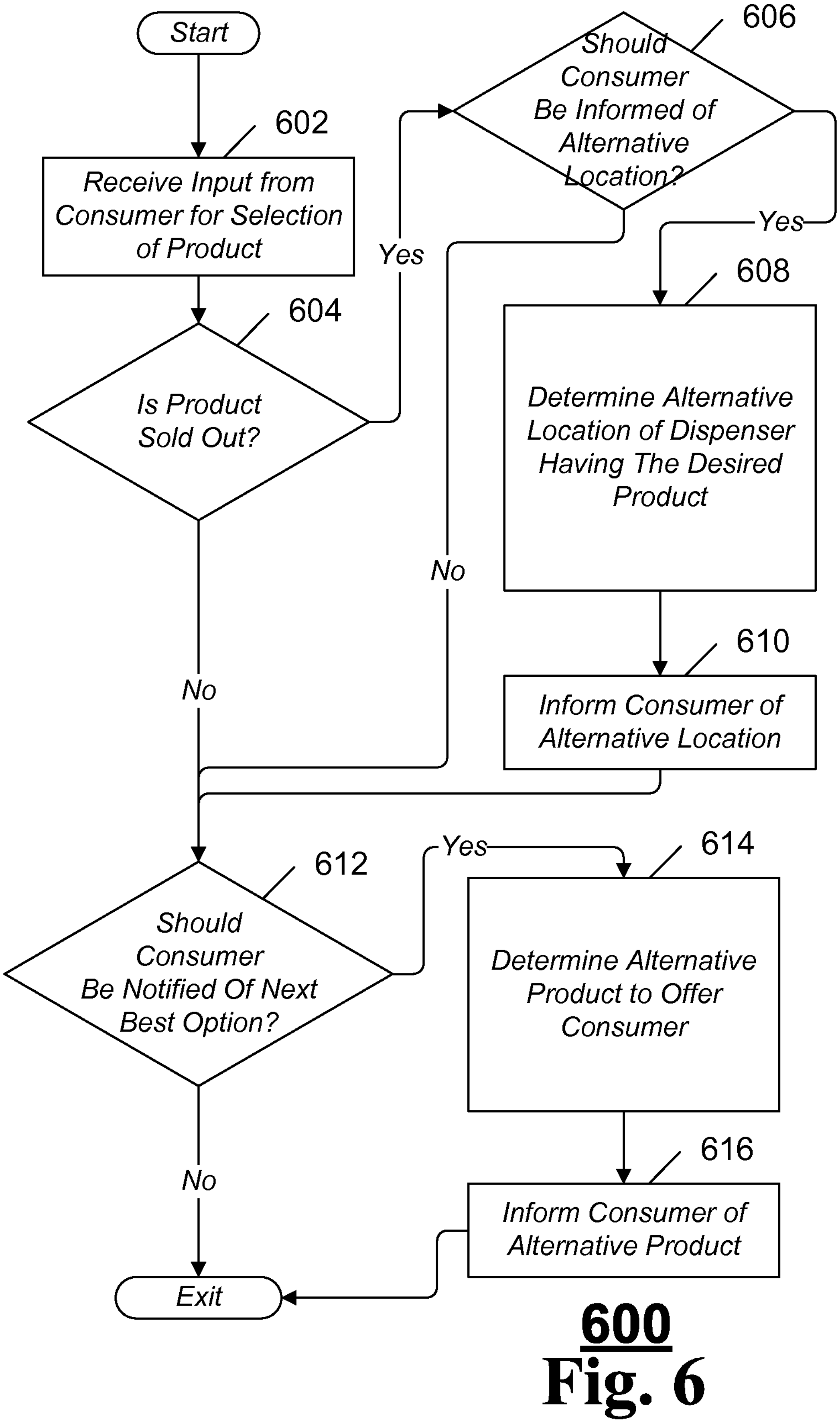
FIG. 6 illustrates one example method to inform consumers of product or beverage options when the consumer's first choice is unavailable in accordance with an embodiment of the invention.

Referring to FIG. 6, one example method 600 to inform consumers of product or beverage options when the consumer's first choice is unavailable is shown.

The method 600 begins in block 602. In block 602, an input from a consumer to select a product, such as a beverage, is received. In the embodiment shown in FIG. 5, a consumer can enter data via a user interface, such as 112 in FIG. 1, associated with a product dispenser, such as 102A, for instance a selection of an indicator corresponding to DIET CHERRY COKE™. In other embodiments, other products or beverages can be selected by a consumer, or other data associated with one or more product or beverage selections can be entered by a consumer at a product dispenser.

Block 602 is followed by decision block 604, in which a determination is made as to whether the selected product or beverage is sold out or otherwise unavailable. If the determination is in the affirmative, that is, the selected product or beverage is sold out or otherwise unavailable, then the method 600 continues at decision block 606. If the determination is in the negative, that is, the product or beverage is not sold out or is available, then the method 600 continues at decision block 612. In the embodiment shown in FIG. 6, a processor or controller, such as 106 in FIG. 1, associated with the product dispenser, such as 102A in FIG. 1 or 210 in FIG. 2, can determine whether the consumer selected product or product is sold out or otherwise unavailable. For example, the processor or controller, such as 106, can receive a consumer input or selection via a user interface, such as 112, and compare the input or selection to previously stored information associated with product or beverage availability or inventory.

In decision block 606, a determination is made as to whether the consumer should be informed of an alternative location of a product dispenser. If the determination is in the affirmative, that is, the consumer should be informed of an alternative location of a product dispenser, then the method 600 continues at block 608. If the determination is in the negative, that is, the consumer should not be informed of an alternative location of a product dispenser, then the method 600 continues at decision block 612. In the embodiment shown in FIG. 6, a processor or controller, such as 106 in FIG. 1, associated with the product dispenser, such as 102A, can determine whether the consumer should be informed of an alternative location of a product dispenser. For example, the processor or controller, such as 106, can make the determination based at least in part on one or more rules for informing a consumer. In one embodiment, a set of rules associated with a specific consumer can be implemented, such as a set of consumer preferences for notifying the consumer of one or more predefined events. In another embodiment, a set of general rules can be implemented, such as a set of general rules for notifying any consumer of one or more predefined events. In yet another embodiment, should the consumer try to dispense a product or beverage from a product dispenser and the desired product or beverage is determined to be sold out, the product dispenser can inform the consumer where another product dispenser serving the same and/or similar products or beverages is located.

In block 608, the product dispenser determines at least one alternative location of a product dispenser serving the same and/or similar products or beverages. In the embodiment shown, a processor or controller, such as 106 in FIG. 1, associated with the product dispenser 102A can communicate with or otherwise transmit data to a local and/or remote server or data processing resource, such as 126. Based at least in part on the communication or data received from the local and/or remote server or data processing resource, such as 126, the processor or controller, such as 106, can determine at least one alternative location of a product dispenser serving the same and/or similar products or beverages.

Block 608 is followed by block 610, in which the consumer is informed of one or more alternative locations of a product dispenser serving the same and/or similar products or beverages. In this embodiment, location information can be sent to a consumer by a processor or controller associated with a product device, such as controller 106 in FIG. 1. The location information can be displayed on a user interface associated with a product dispenser, such as interface 112 associated with dispenser 102A.

Block 610 is followed by decision block 612, in which a determination is made as to whether the consumer should be notified of one or more next best product or beverage options. If the determination is in the affirmative, that is, the consumer should be notified of one or more next best product or beverage options, then the method 600 continues at block 614. If the determination is in the negative, that is, the consumer should not be notified of one or more next best product or beverage options, then the method 600 ends. In the embodiment shown in FIG. 6, a processor or controller, such as 106 in FIG. 1, associated with the product dispenser, such as 102A, can determine whether the consumer should be notified of one or more next best product or beverage options. For example, the processor or controller, such as 106, can make the determination based at least in part on one or more rules for informing a consumer. In another embodiment, a processor or controller, such as 106, associated with the product dispenser, such as 102A, can communicate with a server or data processing resource, such as 126, to make the determination based at least in part on one or more rules for informing a consumer. In one embodiment, a set of rules associated with a specific consumer can be implemented. In another embodiment, a set of general rules can be implemented.

Decision block 612 is followed by block 614, in which the product dispenser communicates with local and/or remote data processing resources to determine one or more next best or alternative product or beverage options. In the embodiment shown, a processor or controller, such as 106 in FIG. 1, associated with the product dispenser, such as 102A, can communicate with or otherwise transmit data to a local and/or remote server or data processing resource, such as 126. Based at least in part on the data received from the local and/or remote server or data processing resource, such as 126, the processor or controller, such as 106, can determine one or more next best product or beverage options, such as an alternative product.

Block 614 is followed by block 616, in which the consumer is informed of one or more next best or alternative product or beverage options. In this embodiment, information associated with one or more next best product or beverage options can be sent to a consumer by a processor or controller associated with a product device, such as controller 106 in FIG. 1. The information associated with one or more next best product or beverage options can be displayed on a user interface associated with a product dispenser, such as 102A.

In one embodiment, a next best product or beverage option can include, but is not limited to, a similar flavor, similar nutraceutical properties, and/or other types and/or kinds of next best or alternative product or beverage options, as may be required and/or desired in a particular embodiment.

The method 600 ends after block 616.

In one embodiment, should a consumer attempt to use a product dispenser and determine that their first choice is unavailable, the product dispenser can inform the consumer of one or more next best or alternative options. The next best or alternative options can include, for example, informing the consumer of the location of another product dispenser that serves the same product or beverage, informing the consumer of another product or beverage selection that has a similar or suitable flavor, at least one nutraceutical value or other comparable properties, and/or informing the consumer of other options as may be required and/or desired in a particular embodiment.

Figure 7:
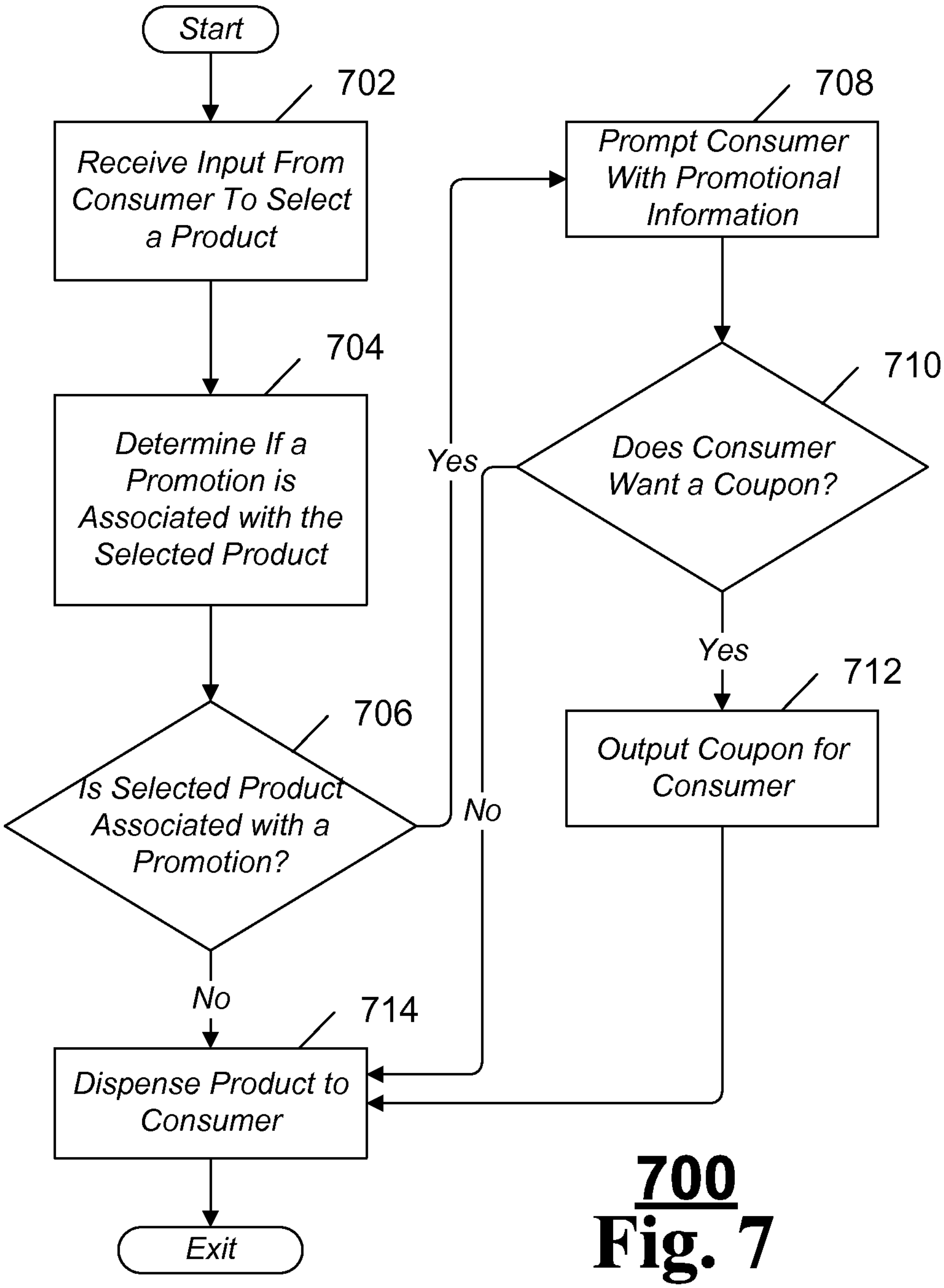
FIG. 7 illustrates one example method of determining a promotion and allowing a consumer to output or print coupons at a product dispenser in accordance with an embodiment of the invention.

Referring to FIG. 7, an example of a method 700 of determining a promotion and allowing a consumer to output or print coupons at a product dispenser is illustrated.

The method 700 begins in block 702. In block 702, an input from a consumer to select a product or beverage is received. In the embodiment shown, a consumer can enter data via a user interface, such as 112 in FIG. 1, associated with a product dispenser, such as 102A, for instance a selection of an indicator corresponding to a product or beverage, such as DIET CHERRY COKE™. In other embodiments, other products or beverages can be selected by a consumer, or other data associated with one or more product or beverage selections can be entered by a consumer. In one embodiment, a product or beverage selection can be effectuated by way of a graphical user interface associated with a product dispenser, such as user interface 112.

Block 702 is followed by block 704, in which the product dispenser communicates locally and/or remotely to determine if there is a promotion associated with the selected product or beverage. In the embodiment shown, a processor or controller, such as 106 in FIG. 1, can communicate with an associated memory or data storage device, such as 110, to determine if a promotion is associated with the selected product or beverage. In one embodiment, a processor or controller, such as 106, can communicate with a local and/or remote server or data processing resource, such as 126, to determine if a promotion is associated with the selected product or beverage. In any instance, the product dispenser communicates locally and/or remotely to determine if there is a promotion associated with the selected product or beverage.

Block 704 is followed by decision block 706, in which a determination is made as to whether the selected product or beverage is part of a promotional offer. If the determination is in the affirmative, that is, the product or beverage selected is part of a promotional offer, then method 700 continues at block 708. If the determination is in the negative, that is, the product or beverage selected is not part of a promotional offer, then the method 700 continues at block 714. In the embodiment shown, a processor or controller, such as 106 in FIG. 1, can determine whether the selected product or beverage is part of a promotional offer. For example, the controller, such as 106, can determine whether the selected product or beverage is part of a promotional offer by obtaining information associated with the selected product or beverage, and determining whether predefined criteria are met, such as whether at least one promotional offer covers or otherwise involves the selected product or beverage. In one embodiment, a processor or controller, such as 106, can communicate with a local and/or remote server or data processing resource, such as 126, which can determine whether the selected product or beverage is part of a promotional offer. In any instance, a determination is made as to whether the selected product or beverage is part of a promotional offer.

In block 708, the consumer is prompted with information associated with the promotion. In the embodiment shown, a processor or controller, such as 106 in FIG. 1, associated with the product dispenser, such as 102A, can prompt or otherwise inform the consumer with information or other details associated with the promotion, such as a product or service offer. For example, after the consumer selects a product or beverage which is part of a promotion, the controller, such as 106, can provide a communication, such as a message, via a user interface associated with the product dispenser, such as user interface 112, with information or other details associated with the promotion, such as a product or service offer.

Block 708 is followed by decision block 710, in which a determination is made as to whether the consumer wants a coupon. If the determination is in the affirmative, that is, the consumer wants a coupon, then the method 700 continues at block 712. If the determination is in the negative, that is, the consumer does not want a coupon, then the method 700 continues at block 714. In the embodiment shown, a processor or controller, such as 106 in FIG. 1, associated with the product dispenser, such as 102A, can determine whether the consumer wants a coupon. For example, the processor or controller, such as 106, can receive a consumer input or selection via a user interface, such as 112, and determine whether the input or selection corresponds to whether the consumer wants a coupon.

In block 712, a coupon is output at the product dispenser for the consumer. In the embodiment shown, a processor or controller, such as 106 in FIG. 1, associated with the product dispenser, such as 102A, can facilitate outputting or printing a coupon at the product dispenser for the consumer. For example, after the consumer indicates a desire for a coupon, the controller, such as 106, can facilitate printing of a coupon via a printer associated with the product dispenser, such as printer 134.

In one embodiment, a coupon can be output by a processor or controller to a client-type or wireless communication device, such as 214A-214C in FIG. 2, associated with a consumer, such as 212.

Block 712 is followed by block 714, in which the consumer is allowed to dispense the selected product or beverage. In the embodiment shown, a processor or controller, such as 106 in FIG. 1, associated with the product dispenser, such as 102A, can allow the consumer to dispense a desired product or beverage.

The method 700 ends after block 714.

In one embodiment, a promotion can be associated with a product dispenser in general and/or associated with a particular product or beverage. In this regard, the consumer can select a product or beverage, a promotion opportunity can be determined by the product dispenser, and a coupon can be printed for the consumer by an associated printer.

Figure 8:
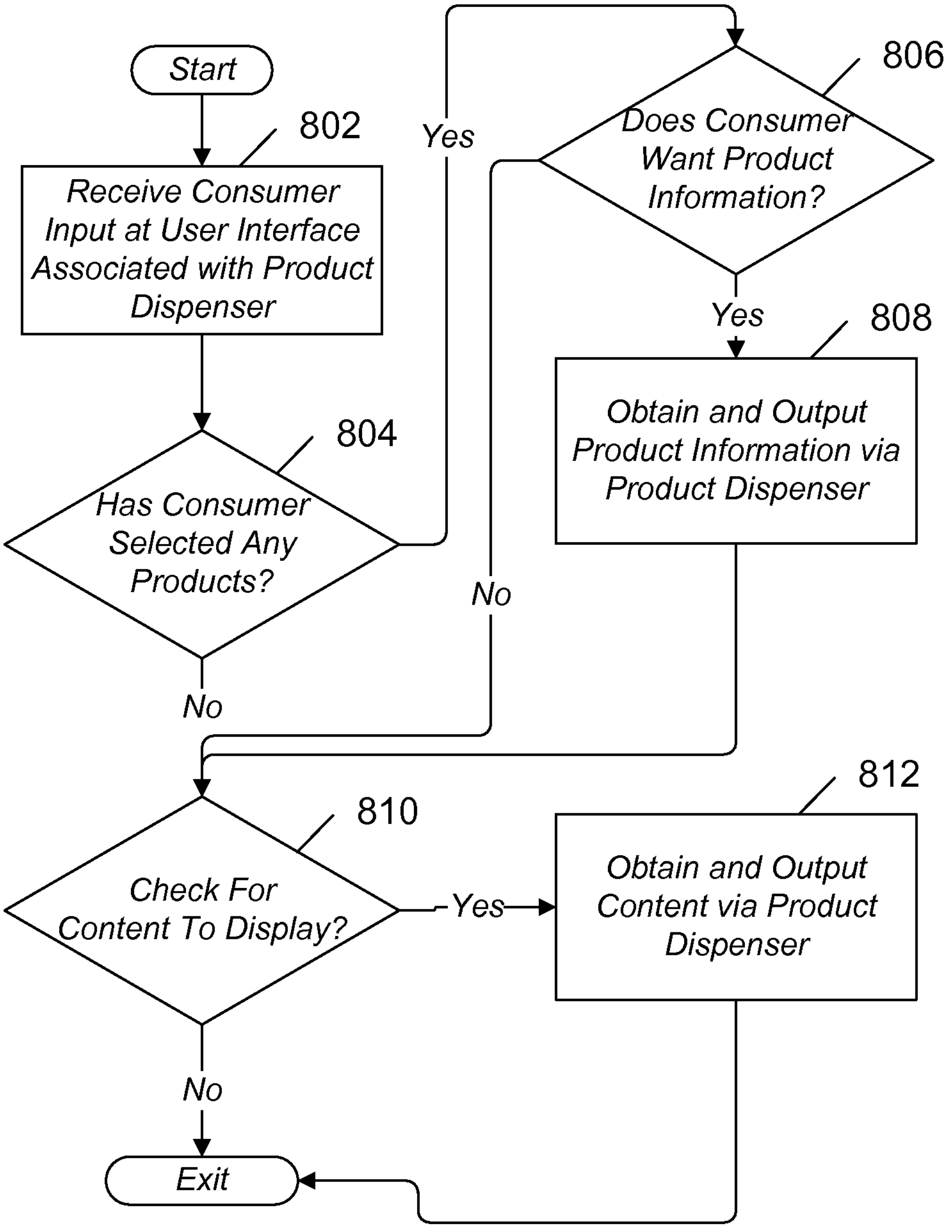
FIG. 8 illustrates one example method of providing product information and content on a product dispenser consumer interface in accordance with an embodiment of the invention.

Referring to FIG. 8, one example method 800 for providing a user interface for a product dispenser is illustrated. In this embodiment, a consumer may desire to have product related informational data displayed on a user interface associated with a particular product dispenser. In this regard, information such as product benefits, ingredients, health and wellness data, and/or other types and/or kinds of informational data can be displayed on a product dispenser proximate to the consumer.

In one embodiment, a product dispenser may initiate the display by way of a local and/or remote server or data processing resource, which may elect to retrieve and display informational data on a product dispenser proximate to the consumer. Such informational data may be selected based at least in part on consumer interaction with the user interface associated with the product dispenser.

The method 800 begins at block 802, in which an input from a consumer input is received at a user interface associated with a product dispenser. In this embodiment, a consumer can manipulate, input, or otherwise interact with a user interface, such as 112 in FIG. 1, associated with a product dispenser, such as 102A. In one embodiment, a user interface can also be referred to as a consumer interface. Examples of suitable user interfaces can include, but are not limited to, an enhanced view graphical user interface, such as 300, and a classic type graphical user interface, such as 400.

Block 802 is followed by decision block 804, in which a determination is made whether the consumer has selected any products, such as a beverage. If the determination is in the affirmative, that is, the consumer has selected a product, then the method 800 continues to decision block 806. If the determination is in the negative, that is, the consumer has not selected any products, then method 800 continues at decision block 810. In this embodiment, a processor or controller, such as 106 in FIG. 1, associated with the product dispenser, such as 102A, can determine whether a consumer selects any products, such a beverage, from the product dispenser 102A.

In decision block 806, a determination is made whether the consumer wants product information. If the determination is in the affirmative, that is, the consumer wants product information, then the method 800 continues at block 808. If the determination is in the negative, that is, the consumer does not want product information then the method 800 continues at decision block 810. In this embodiment, the processor or controller, such as 106, associated with the product dispenser, such as 102A, can determine whether a consumer wants product information by way of detecting or receiving input from the user via a user interface, such as 112, associated with a product dispenser, such as 102A.

In block 808, the product dispenser communicates with a data processing resource, such as locally and/or remotely, to obtain and output product information. In this embodiment, the processor or controller, such as 106 in FIG. 1, associated with the product dispenser, such as 102A, can transmit a request for product information, and receive product information from a server or data processing resource, such as 126. The processor or controller, such as 126, can display received product information via a user interface, such as 112, associated with the product dispenser, such as 102A.

Block 808 is followed by decision block 810, in which a determination is made whether content exists to be displayed. If the determination is in the affirmative, that is, there is content to display, then the method 800 continues at block 812. If the determination is in the negative, that is, there is no content to display, then method 800 ends. In this embodiment, the processor or controller, such as 106 in FIG. 1, associated with the product dispenser, such as 102A, can determine whether content for display is received from a server or data processing resource, such as 126. The processor or controller, such as 106, can display received content via a user interface, such as 112, associated with the product dispenser, such as 102A.

In block 812, the product dispenser communicates with a data processing resource, such as locally and/or remotely, to obtain and output content. In this embodiment, the processor or controller, such as 106, associated with the product dispenser, such as 102A, can receive content, such as digital content, for output from a server or data processing resource, such as 126. The processor or controller, such as 106, can output or display received content via a user interface, such as 112, associated with the product dispenser, such as 102A.

The method 800 ends after block 812.

Figure 9:
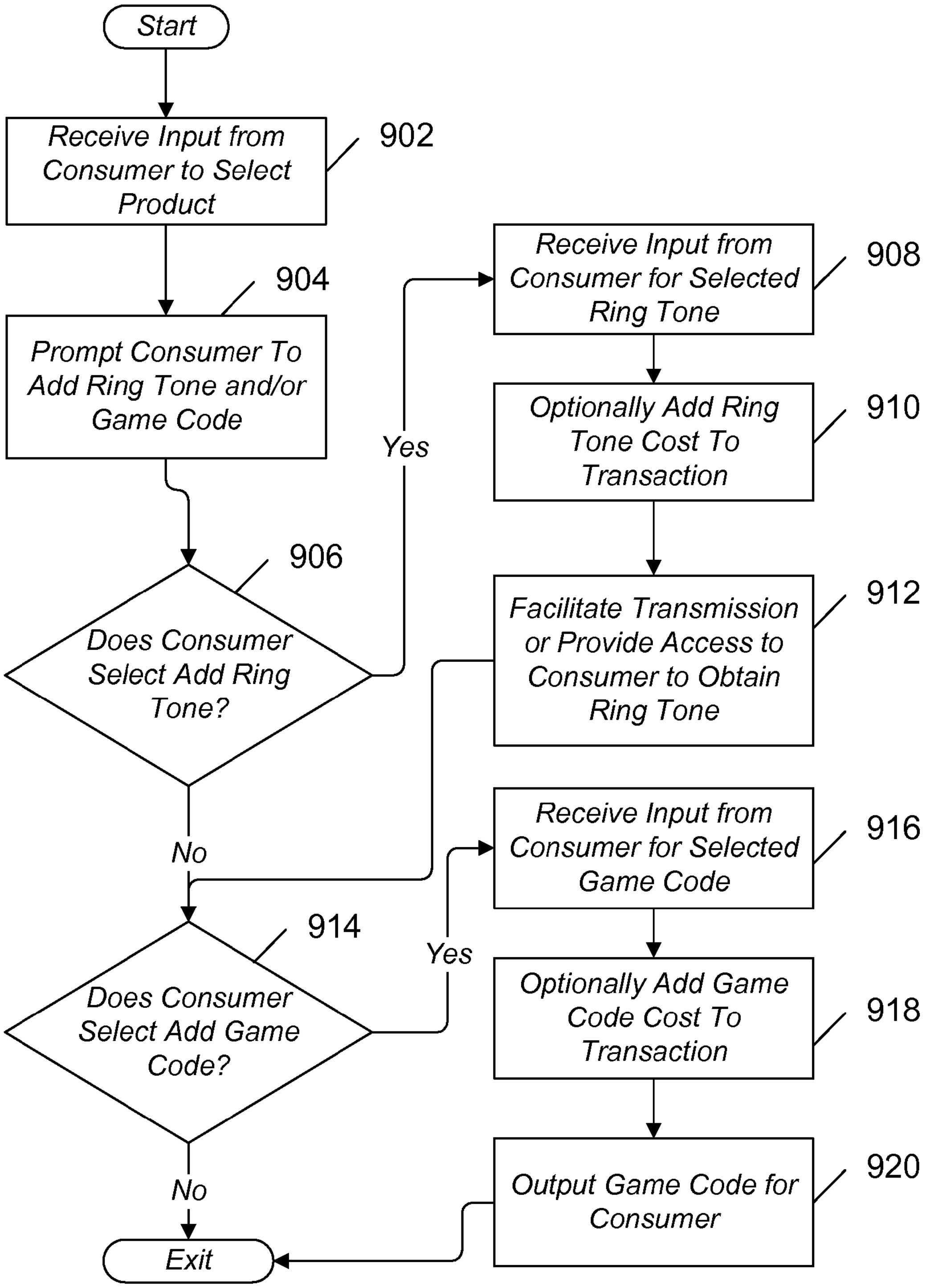
FIG. 9 illustrates one example of a method of providing game codes and/or ring tones in combination with dispensing a product or beverage in accordance with an embodiment of the invention.

Referring to FIG. 9, an example method 900 of providing game codes and/or ring tones in combination with dispensing a product or beverage is illustrated.

The method 900 begins in block 902, in which the consumer is allowed to select a product or beverage to be dispensed from a product dispenser. In the embodiment shown, a consumer can enter data via a user interface, such as 112 in FIG. 1, associated with a product dispenser, such as 102A, for instance a selection of an indicator corresponding to DIET CHERRY COKE™. In other embodiments, other products or beverages can be selected by a consumer, or other data associated with one or more product or beverage selections can be entered by a consumer.

Block 904 is followed by decision block 906, in which a determination is made as to whether the consumer has selected to add a ring tone to the transaction. If the determination is in the affirmative, that is, the consumer has selected or otherwise opted to add a ring tone to the transaction, then the method 900 continues at block 908. If the determination is in the negative, that is, the consumer has not selected or otherwise opted to add a ring tone to the transaction, then the method 900 continues at decision block 914. In the embodiment shown, a processor or controller, such as 106 in FIG. 1, associated with the product dispenser, such as 102A, can determine whether the consumer has selected or otherwise opted to add a ring tone to the transaction.

Block 904 is followed by decision block 906, in which a determination is made as to whether the consumer has selected to add a ring tone to the transaction. If the determination is in the affirmative, that is, the consumer has selected or otherwise opted to add a ring tone to the transaction, then the method 900 continues at block 908. If the determination is in the negative, that is, the consumer has not selected or otherwise opted to add a ring tone to the transaction, then the method 900 continues at decision block 914. In the embodiment shown, a processor or controller, such as 106 in FIG. 1, associated with the product dispenser, such as 102A, can determine whether the consumer has selected or otherwise opted to add a ring tone to the transaction.

Referring to block 908, an input is received from the consumer to select a ring tone that he or she would like to acquire. In the embodiment shown, a processor or controller, such as 106 in FIG. 1, associated with the product dispenser, such as 102A, provides one or more options for the consumer via a user interface, such as 112, to select a ring tone that he or she would like to acquire. The user interface, such as 112, can permit the consumer to review, listen, and select one or more ring tones.

Block 908 is followed by block 910, in which the ring tone cost is optionally added to the transaction. In the embodiment shown, a processor or controller, such as 106 in FIG. 1, associated with the product dispenser, such as 102A, can add the cost of any consumer selected ring tones to the cost of the transaction. In one embodiment, a transaction can also be referred to as a purchase.

Block 910 is followed by block 912, in which the selected ring tone is communicated to the consumer. In the embodiment shown, a processor or controller, such as 106 in FIG. 1, associated with the product dispenser, such as 102A, can facilitate transmission of one or more of the selected ring tones to the consumer. For example, the processor or controller, such as 106, can communicate with a local and/or remote server or data processing resource, such as 126, to facilitate transmission of one or more of the selected ring tones to the consumer. In one embodiment, a local and/or remote server or data processing resource, such as 126, can transmit one or more selected ring tones to the consumer via a network, such as 104. In another embodiment, a local and/or remote server or data processing resource, such as 126, can transmit one or more selected ring tones to the consumer via the product dispenser, such as 102A, and the product dispenser, such as 102A, can transmit the ring tones to the consumer via a network, such as 104. In any instance, the selected ring tone is communicated to the consumer.

In one embodiment, acquiring a ring tone can include data communicating the ring tone to the consumer, a data processing resource, emailing the ring tone, and/or otherwise allowing the consumer to acquire the ring tone, as may be required and/or desired in a particular embodiment.

Block 912 is followed by decision block 914, in which a determination is made as to whether the consumer has selected to acquire a game code. If the determination is in the affirmative, that is, the consumer has selected or otherwise opted to acquire a game code, then the method 900 continues at block 916. If the determination is in the negative, that is, the consumer has not selected or otherwise opted to acquire a game code, then the method 900 ends. In the embodiment shown, a processor or controller, such as 106 in FIG. 1, associated with the product dispenser, such as 102A, can determine whether the consumer has selected or otherwise opted to acquire one or more game codes.

Referring to block 916, an input is received from the consumer to select a game code. In the embodiment shown, a processor or controller, such as 106 in FIG. 1, associated with the product dispenser, such as 102A, provides one or more options for the consumer via a user interface, such as 112, to select a game code that he or she would like to acquire. The user interface, such as 112, can permit the consumer to review, observe, and select one or more game codes.

Block 916 is followed by block 918, in which the cost of the game code is optionally added to the transaction. In the embodiment shown, a processor or controller, such as 106 in FIG. 1, associated with the product dispenser, such as 102A, can add the cost of any consumer selected game codes to the cost of the transaction. In one embodiment, a transaction can also be referred to as a purchase.

Block 918 is followed by block 920, in which the selected game code is output or otherwise communicated to the consumer. In the embodiment shown, a processor or controller, such as 106 in FIG. 1, associated with the product dispenser, such as 102A, can facilitate transmission of one or more of the selected game codes to the consumer. For example, the processor or controller, such as 106, can communicate with a local and/or remote server or data processing resource, such as 126, to facilitate transmission of one or more of the selected game codes to the consumer. In one embodiment, a local and/or remote server or data processing resource, such as 126, can transmit one or more selected game codes to the consumer via a network, such as 104. In another embodiment, a local and/or remote server or data processing resource, such as 126, can transmit one or more selected game codes to the consumer via the product dispenser, such as 102A, the product dispenser, such as 102A, can transmit the game codes to the consumer via a network, such as 104. In any instance, the selected game code is communicated to the consumer.

In one embodiment, acquiring one or more game codes can be by way of displaying the game code on the product dispenser graphical user interface, printing, emailing, and/or by way of other methods, as may be required and/or desired in a particular embodiment.

The method 900 ends after block 920.

In one embodiment a consumer can be prompted to add one or more game codes or ring tones at the time a product or beverage is dispensed. In this regard, the consumer can elect to receive a game code that can be used on a video game for players advantage, and/or acquire a ring tone that can be utilized on a wireless communication device.

Figure 10:
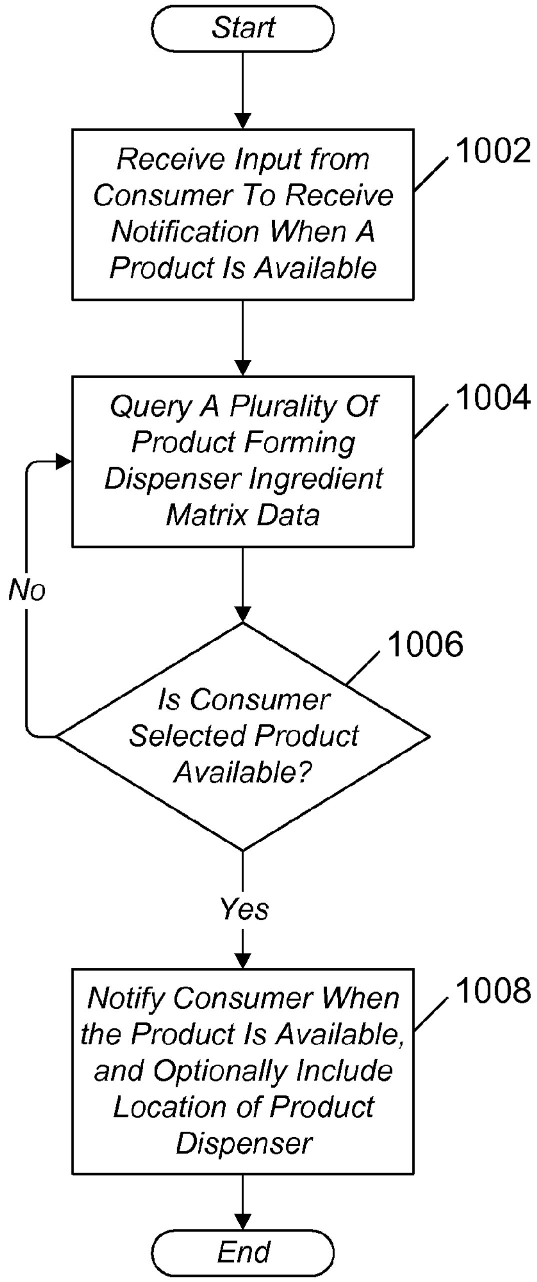
FIG. 10 illustrates one example method of a consumer signing up to be notified when a new product or beverage type is available in accordance with an embodiment of the invention.

Referring to FIG. 10, an example method 1000 for notifying a consumer regarding beverage availability is illustrated. In the embodiment shown in FIG. 10, a consumer can sign up to receive a notification, and can be notified regarding beverage availability when the beverage becomes available. From time to time, one or more product dispensers can be reconfigured to dispense different types and kinds of beverage as may be required and/or desired in a particular embodiment. Such drink availability data and information can be communicated via a network, such as 204 in FIG. 2 and/or otherwise be aggregated, stored, and made accessible on a server or data processing resource, such as 206 in FIG. 2. A data processing resource can be, for example and as a limitation, a data processing resource, such as 206 or 126 in FIG. 1, a server, a network-based server or data processing resource, and/or other types and kinds of servers or data processing resources as may be required and/or desired in a particular embodiment.

The method 1000 begins in block 1002. In block 1002, an input is received from a consumer to receive a notification when a product or beverage is available. A consumer sign up can comprise collecting or otherwise receiving consumer data, such as consumer selections, preferences and/or other types and kinds of data, as may be required and/or desired in a particular embodiment. In this embodiment, a client-type device, such as 214A-214C in FIG. 2, can communicate consumer data via a network, such as 204, to a server or data processing resource, such as 126 or 206. In other embodiments, a consumer sign up can be facilitated online, by phone, email, a wired or wireless communication device and/or by way of other types and kinds of signup, as maybe required and/or desired in a particular embodiment.

Block 1002 is followed by block 1004, in which a query of a plurality of data from one or more product dispenser ingredient matrixes is generated. In this embodiment, a server or data processing resource, such as 126 or 206, can generate a query to obtain data from one or more product dispenser ingredient matrixes. Data from one or more product dispenser ingredient matrixes can include, but is not limited to, locations of some or all associated product dispensers, beverages offered by some or all associated product dispensers, and expected time or life for offering particular beverages at some or all associated product dispensers. A query of a plurality of data can be, for example, communicated to one or more controllers associated with respective product dispenser ingredient matrixes, such as 108 in FIG. 1, by a server or data processing resource, such as data processing resource 126 or 206, as may be required and or desired in a particular embodiment.

Block 1004 is followed by decision block 1006, in which a determination is made as to whether a consumer-selected product or beverage is available. If the determination is in the affirmative, that is, the consumer-selected product or beverage is available then the method 1000 continues to block 1008. If the determination is in the negative, that is, the consumer-selected product or beverage is not available, then the method 1000 returns to block 1004. In the embodiment shown, a server or data processing resource, such as data processing resource 126 or 206, can compare a query to some or all consumer data obtained or received at consumer sign up, and the server or data processing resource, such as 126 or 206, can make a determination whether a consumer-selected product or beverage is available. Consumer data can include, but is not limited to, consumer selections, preferences and/or other types and kinds of data, as maybe required and or desired in a particular embodiment. The comparison can determine if at least one consumer requested notification that his or her selections and/or preferences are or are not available.

In one embodiment, a query can be compared to promotional data, marketing preferences, criteria, and/or other types and kinds of promotional or marketing-type data. For instance, when a query of one or more ingredient matrixes from one or more product dispensers is performed, the query data can be compared to a signed up consumer database, and one or more consumers can be notified regarding promotions based on product or beverage availability, marketing strategies, consumer preferences, and/or based on other data.

Returning to block 1008, a consumer is notified of the availability of a consumer-selected product or beverage. In this embodiment, a server or data processing resource, such as data processing resource, such as 126 or 206, can notify at least one consumer of the availability of the consumer-selected product or beverage. Based at least in part on the determination in decision block 1006, the data processing resource, such as 126 or 206, can generate and transmit a notification to at least one consumer requesting or selecting a particular product or beverage. Optionally, in one embodiment, one or more locations of one or more product dispensers and/or promotional communications can be communicated to one or more consumers via a notification.

In one embodiment, one or more consumers can define one or more consumer preferences or sign up to receive notifications when the availability of one or more products or beverages at one or more product dispensers changes, when one or more products or beverages otherwise become available, or when a designated notification event occurs or is about to occur. A server or data processing resource, such as data processing resource, such as 126 or 206, can compare data to determine when selected products or beverages become available, and generate and transmit notifications to consumers when appropriate. Consumers can designate one or more notification events including, but not limited to, the launch of a new or previously unavailable flavor, the expected launch of a new or previously unavailable flavor, or the availability of new or previously unavailable types and kinds of products or beverages as may occur when an ingredient matrix composition is changed or otherwise altered. Notifications can be, for example, by email, text message, a voice mail, wired or wireless communications and/or by way of other types and/or kinds of notifications, as may be required and/or desired in a particular embodiment.

In one embodiment, one or more consumers can define one or more consumer preferences or sign up to be notified when a new or previously unavailable product or beverage is available at a local or otherwise nearby product dispenser. A server or data processing resource, such as data processing resource, such as 126 or 206, can compare data to determine when new or previously unavailable products or beverages become available, and generate and transmit notifications to consumers when appropriate. Prior to or when the new or previously unavailable product or beverage is made available at a particular product dispenser, the consumer can be informed and/or otherwise notified. A notification can include, for instance, a promotion such as free product or drink coupon, a buy one-get-one-free offer, and/or other types and kind of promotions as may be required and/or desired in a particular embodiment.

After block 1008, the method 1000 ends.

Figure 11:
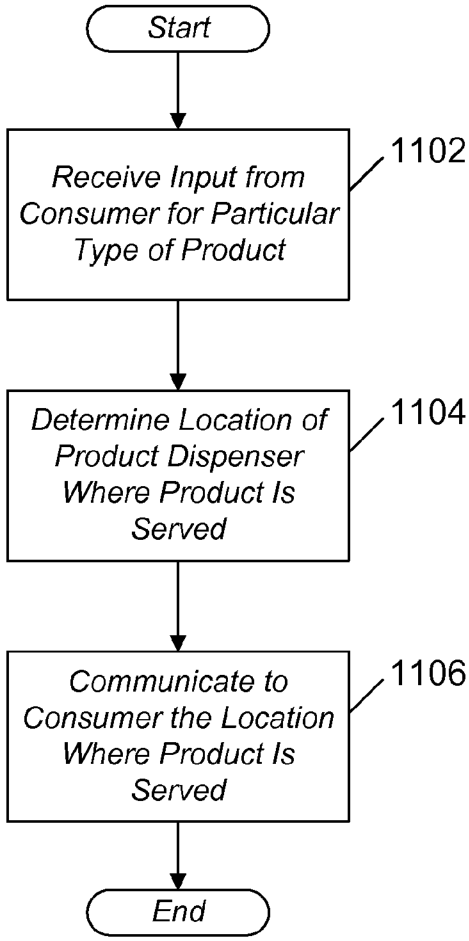
FIG. 11 illustrates one example method of a consumer determining the location of a type of product or beverage in accordance with an embodiment of the invention.

Referring to FIG. 11, an example method 1100 for notifying a consumer of a location of a particular type of product or beverage is illustrated. In the embodiment shown in FIG. 11, a consumer can enter one or more consumer preferences, such as the type of product or beverage he or she may be interested in. In response to the consumer's preferences or input, one or more locations where such products or beverages can be determined. The consumer can be informed of the locations of product dispensers where such products or beverages can be obtained. Such consumer input can be facilitated via online, email, voice mail, wired or wireless communications, or a wireless communication device, such as a wireless device and/or by other methods as may be required and or desired in a particular embodiment.

The method 1100 begins in block 1102. In block 1102, an input is received from a consumer for a particular type of product or beverage. In the embodiment shown in FIG. 11, entering of data by a consumer can be facilitated online and/or by way of other methods as may be required and/or desired in a particular embodiment. For example, a consumer can enter data via a client-type device, such as 214A in FIG. 2, and enter or otherwise input data corresponding to their interest in a particular beverage, such as DIET CHERRY COKE™. In other embodiments, other products or beverages can be selected by a consumer, or other data associated with one or more product or beverage selections can be entered by a consumer.

In one embodiment, a consumer can enter or input data online, such as a website available via the Internet and facilitated by a server or data processing resource, such as 126 or 206. The consumer may be prompted by the website to enter data corresponding with interests in health and wellness, a list of products or beverages associated with health or wellness, product or beverage attributes, and the location of product dispensers dispensing such products or beverages.

Block 1102 is followed by block 1104, in which at least one location is determined for a product dispenser where a particular product or beverage is dispensed or served. In the embodiment shown in FIG. 11, a server or data processing resource, such as 126 or 206, can receive or otherwise obtain data associated with a consumer input, and based at least in part on such data, can determine or otherwise generate a list of one or more locations where respective product dispensers dispensing or serving the particular product or beverage may be located. In one embodiment, a server or data processing resource, such as 126 or 206, can perform a query of an associated data storage device, and based at least in part on previously stored data, can determine or otherwise generate a list of one or more locations where respective product dispensers dispensing or serving the particular product or beverage may be located.

Block 1104 is followed by block 1106, in which one or more locations where particular products or beverages are dispensed or otherwise served can be communicated to the consumer. In the embodiment shown in FIG. 11, a server or data processing resource, such as 126 or 206, can transmit a notification to the consumer via a network, such as 104 or 206, and the notification can be received by the consumer via a client-type device, such as 214A. Such notification can be facilitated online, by wired or wireless communication, data communicated to a wireless communication device, and/or by way of other communication as may be required and/or desired in a particular embodiment.

The method 1100 ends at block 1106.

Figure 12:
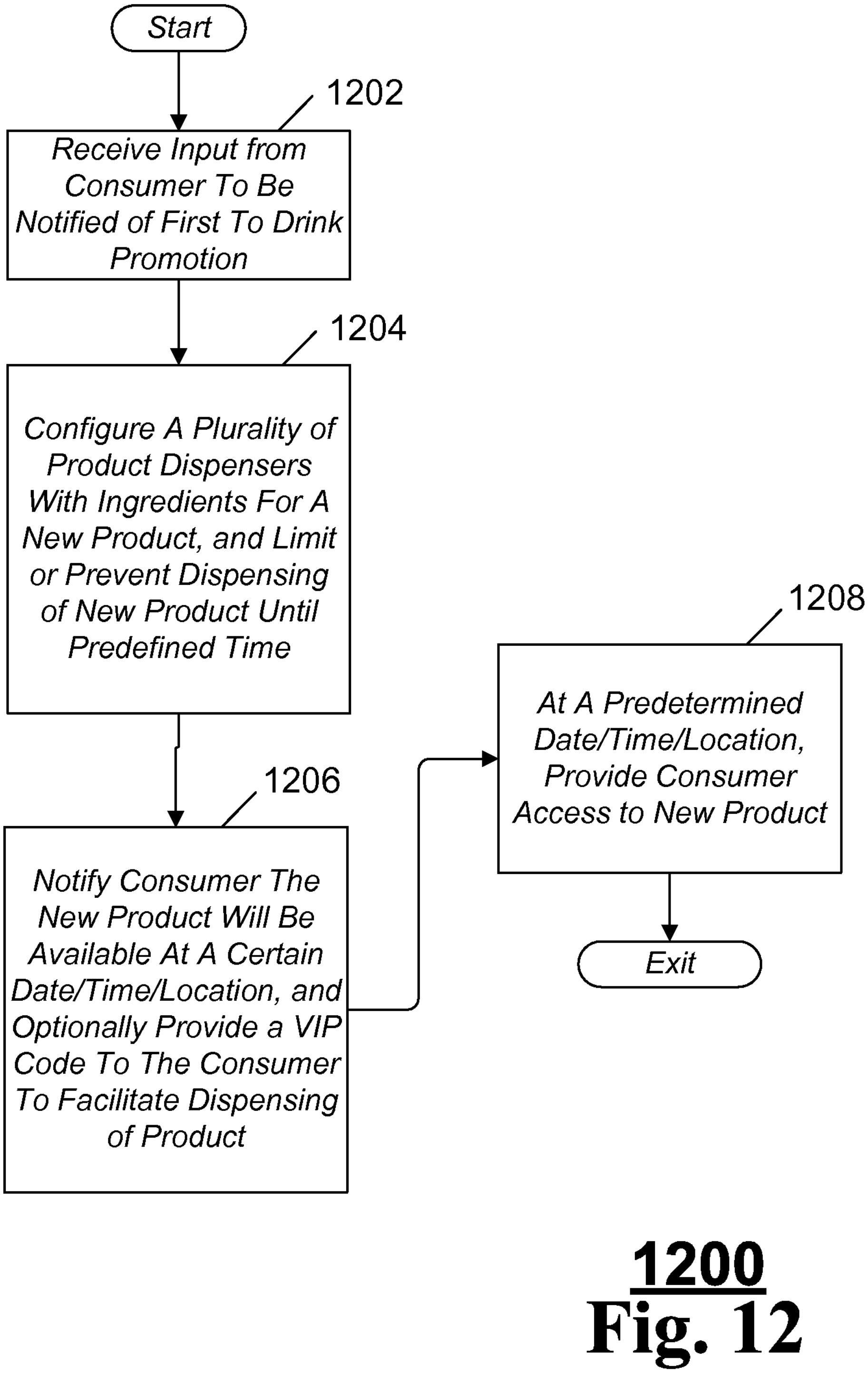
FIG. 12 illustrates one example of a method of effectuating a 'first-to-drink' promotion in accordance with an embodiment of the invention.

Referring to FIG. 12, an example of a method 1200 for providing a "first-to-drink" promotion is illustrated.

The method 1200 begins at block 1202. In block 1202, an input is received from a consumer to be notified of a "first to drink" promotion. In this embodiment, a product dispenser, such as 102A in FIG. 1, can receive or otherwise obtain consumer preferences and/or signup information associated with a consumer. Based at least in part on the information, a processor or controller, such as 106, associated with the product dispenser, such as 102A, can store the consumer preferences and/or signup information associated with the consumer. For example, consumers can define one or more consumer preferences or signup to be notified when a new product or beverage formulation is available. Consumers can elect to be notified in a particular manner when new product or beverage formulations are to be released. Signup information can include, but is not limited to, inputs or selections by way of an online webpage, website, or online location, such as MYCOKEREWARDS.COM, or other types and/or kinds of signup devices or methods, as may be required and/or desired in a particular embodiment.

Block 1202 is followed by block 1204, in which a plurality of product dispensers can be configured with new product ingredients capable of dispensing a new product or beverage formulation. In this embodiment, one or more product dispensers, such as 102A in FIG. 1, can be configured or receive one or more new product ingredients. For instance, a product ingredient package can be installed within an ingredient matrix within a product dispenser, such as 102A. A processor or controller, such as 106, associated with the product dispenser, such as 102A, can limit or otherwise prevent consumer access to one or more products or beverages utilizing the one or more new product ingredients. For instance, though the ingredients have been installed or configured in a particular product dispenser, the product dispenser, such as 102A, can limit or prevent consumer selection of a new product or beverage formulation utilizing one or more new product ingredients.

Block 1204 is followed by block 1206, in which each of the signed up consumers can be notified that the new product or beverage formulation will be available at a certain date, time, and/or location. In the embodiment shown, a processor or controller, such as 106 in FIG. 1, associated with the product dispenser, such as 102A, can generate or otherwise transmit a communication to one or more selected consumers that at least one new product or beverage formulation will be available at a certain date, time, and/or location. The processor or controller, such as 106, can provide the message to the consumer via an output device, such as a user interface, for instance 112. In another embodiment, a local and/or remote server or data processing resource, such as 126, can generate a communication or other output, such as a message, and transmit the message to the product dispenser, such as 102A, for communication to the consumer. The processor or controller, such as 106, associated with the product dispenser, such as 102A, can receive the message for communication to the consumer. In yet another embodiment, a local and/or remote server or data processing resource, such as 126, can generate a communication or other output, such as a message, and transmit the message to a client-type device, such as 214A-214C in FIG. 2, for consumers to receive via a network, such as 104. In any instance, each of the signed up consumers can be notified that the new product or beverage formulation will be available at a certain date, time, and/or location.

In one embodiment, at least some of the signed up consumers can be provided a code, such as a VIP (very important person) code, to access one or more product dispensers with at least one new beverage formulation. In this embodiment, a communication to selected consumers can include a code, such as a VIP code, for the consumers to input or otherwise provide to a product dispenser prior to obtaining at least one new product or beverage formulation. The code, or VIP code, can be a predefined or unique code that a local and/or remote server or data processing resource, such as 126, can provide to the selected consumers via a product dispenser, such as 102A, or a client-type device, such as 214A-214C in FIG. 2.

Block 1206 is followed by block 1208, in which at a predetermined date, time and/or location, a local and/or remote data communication with a data processing resource can communicate with some or all of the product dispensers having the new product or beverage formulation to facilitate access to the new product or beverage formulation by notified consumers and/or VIP code recipients. In the embodiment shown, a processor or controller, such as 106 in FIG. 1, associated with the product dispenser, such as 102A, can provide or otherwise grant access, at a predetermined date, time and/or location, for at least one notified consumer and/or VIP code recipient to at least one of the new product or beverage formulation. In this regard, a product dispenser may allow at least some consumers to utilize a code, such as a VIP code, to access at least one new product or beverage formulation.

In one embodiment, some or all of the notified, signed up consumers can be granted access to at least one product dispenser and dispense at least one new product or beverage formulation. Such access to at least one new product or beverage formulation by a notified consumer can be provided for an unlimited or limited period of time. In some instances, after the elapse of a predefined period of time, one or more new product or beverage formulations provided by the product dispenser can become available to all consumers regardless of any notification or signup. For example, in this embodiment, a processor or controller, such as 106 in FIG. 1, associated with the product dispenser, such as 102A, can provide or otherwise grant access for an unlimited or limited time for at least one notified consumer and/or VIP code recipient to access at least one new product or beverage formulation. After the elapse of a predefined period of time, such as 30 days, the controller, such as 106, can provide access for all consumers to one or more new product or beverage formulations provided by the product dispenser regardless of any notification or signup.

The method 1200 ends after block 1208.

Figure 13:
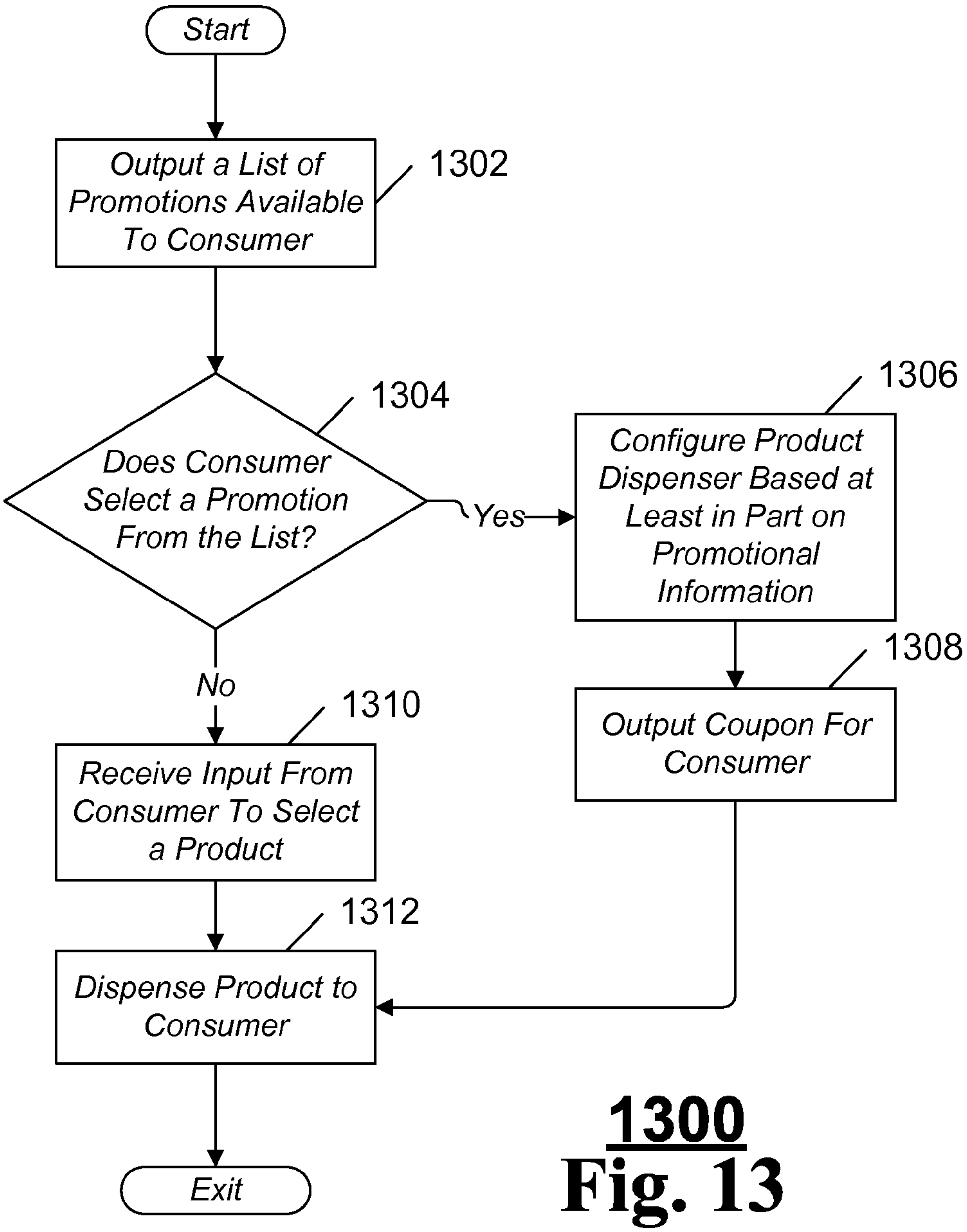
FIG. 13 illustrates one example method of allowing a consumer to select from a list of promotions, configure the product dispenser, and output or print coupons in accordance with an embodiment of the invention.

Referring to FIG. 13, an example method 1300 of allowing a consumer to select from a list of promotions, configuring the product dispenser for a promotional beverage, and outputting promotional coupons is illustrated.

The method 1300 begins in block 1302. In block 1302, promotions available to a consumer can be displayed. In the embodiment shown, a processor or controller, such as 106 in FIG. 1, associated with the product dispenser, such as 102A, can provide a list of promotions to the consumer. For example, the controller, such as 106, can provide a list of promotions, such as one or more promotions associated with selected products or beverages, via a user interface associated with the product dispenser, such as user interface 112.

Block 1302 is followed by decision block 1304, in which a determination is made as to whether the consumer selects a promotion from the list. If the determination is in the affirmative, that is, the consumer selects a promotion from the list, then the method 1300 continues at block 1306. If the determination is in the negative, that is, the consumer does not select a promotion from the list, then the method 1300 continues at block 1310. In this embodiment, a processor or controller associated with a product dispenser, such as controller 106 in FIG. 1, can determine whether the consumer selects a promotion from the list. Based at least in part on an input or selection from a user interface, such as 112, the processor or controller, such as 106, can determine whether the consumer selects a promotion from the list.

In block 1306, the product dispenser is configured to dispense a promotional beverage based at least in part on the promotional information. In this embodiment, a processor or controller associated with a product dispenser, such as controller 106 in FIG. 1, can configure the dispenser to dispense a promotional product or beverage based at least in part on one or more promotional information. In one embodiment, the controller, such as 106, can set various formulation parameters or factors based at least in part on a promotion or associated promotional information or details. In another embodiment, if a promotional offer is to try a specific product or beverage formulation, then a product dispenser can be configured to dispense the particular product or beverage formulation. In any instance, the product dispenser is configured to dispense a promotional product or beverage based at least in part on the promotional information or details.

Block 1306 is followed by block 1308, in which a coupon is output for the consumer. In the embodiment shown, a processor or controller, such as 106 in FIG. 1, associated with the product dispenser, such as 102A in FIG. 1, can facilitate outputting or printing a coupon at the product dispenser for the consumer. For example, after the consumer indicates a desire for a coupon, the controller, such as 106, can facilitate outputting or printing of a coupon via a printer associated with the product dispenser, such as printer 134. In one embodiment, the coupon can be related to a consumer accepted promotional offer.

Block 1308 is followed by block 1312, which is described in greater detail below.

Referring to block 1310, the consumer is allowed to select a product or beverage. In the embodiment shown, a consumer can enter data via a user interface, such as 112 in FIG. 1, such as selection of an indicator corresponding to a product or beverage, such as DIET CHERRY COKE™. In other embodiments, other beverages can be selected by a consumer, or other data associated with one or more product or beverage selections can be entered by a consumer. In one embodiment, a product or beverage selection can be effectuated by way of a graphical user interface associated with a product dispenser, such as user interface 112.

Block 1310 is followed by block 1312, in which the consumer is allowed to dispense the selected product or beverage. In the embodiment shown, a processor or controller, such as 106 in FIG. 1, associated with the product dispenser, such as 102A, can allow the consumer to dispense a desired product or beverage.

The method 1300 ends after block 1312.

In one embodiment, a consumer can be presented with a list of promotions being offered. The consumer can then select a promotion and a product dispenser can be automatically configured to dispense the beverage associated with the promotional offer. The consumer can also receive a promotional coupon. By way of example, a promotional offer for "try a DIET COKE PLUS™ and get a coupon for a discount on a twelve pack of DIET COKE PLUS™" can be presented to the consumer. The consumer can accept the promotional offer, and the product dispenser can be configured to dispense DIET COKE PLUS™ and a coupon can be printed for the promotional discount on the twelve pack of DIET COKE PLUS™.

Figure 14:
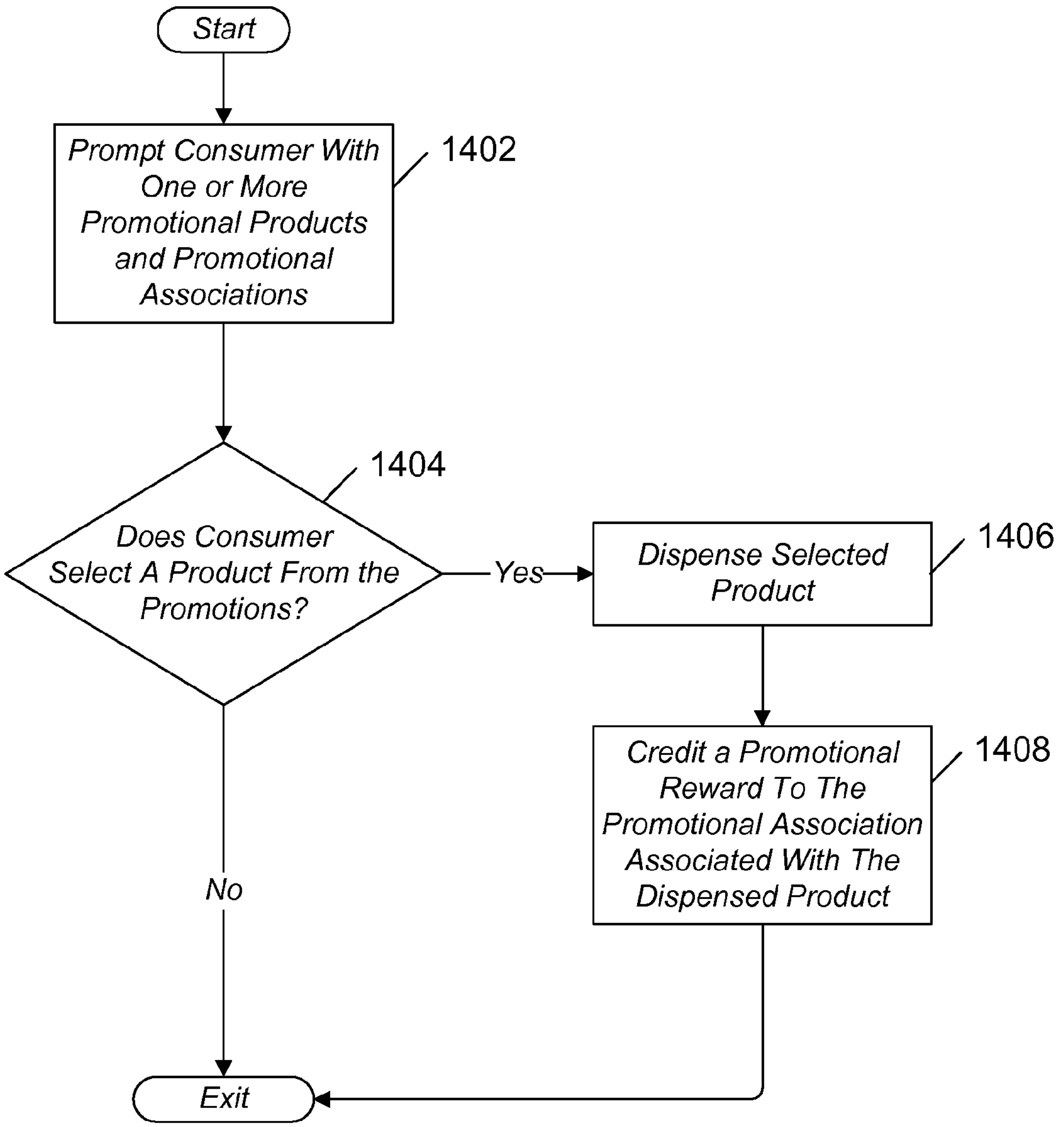
FIG. 14 illustrates one example of a method of selecting a product beverage from a promotional list of products or beverages, wherein each product or beverage on the promotional list has a promotional association in accordance with an embodiment of the invention.

Referring to FIG. 14, an example method 1400 of crediting a promotional award to a promotional association is illustrated.

The method 1400 begins at block 1402, in which a consumer is prompted with a list of promotional products or beverages and their respective promotional associations. In this embodiment, a consumer can be prompted with a list of promotional beverages and their respective promotional associations via a user interface associated with a product dispenser, such as 102A. In one embodiment, a consumer can be prompted with a list of promotional products or beverages and their promotional associations via a client-type device, such as 214A-214C in FIG. 2. In another embodiment, a consumer can be prompted with a list of promotional products or beverages and their promotional associations via a mobile phone, wireless communication device, or other communication device or method. In any instance, a consumer is prompted with a list of promotional product or beverages and their respective promotional associations. In one example, a promotional association can include, but is not limited to, a school, organization, charity, affiliate, person, entity, business, group, or organization.

Block 1402 is followed by decision block 1404, in which a determination is made as to whether the consumer has selected a product or beverage from the promotional list. If the determination is in the affirmative, that is, the consumer has selected a product or beverage from the promotional list, the method 1400 continues at block 1406. If the determination is in the negative, that is, the consumer has not selected a product or beverage from the promotional product or beverage list, then the method 1400 ends. In the embodiment shown, a processor or controller, such as 106 in FIG. 1, associated with the product dispenser, such as 102A, can determine whether the consumer has selected a product or beverage from the promotional list. In another embodiment, a local and/or remote server or data processing resource, such as 126, can determine whether the consumer has selected a product or beverage from the promotional list. In either instance, the processor, controller, local and/or remote server or data processing resource, such as 126, can determine whether the consumer has selected a product or beverage from the promotional list.

In block 1406, the product or beverage is dispensed. In the embodiment shown, a processor or controller, such as 106 in FIG. 1, associated with the product dispenser, such as 102A, can detect or otherwise determine when a product or beverage is dispensed from the product dispenser, such as 102A.

Block 1406 is followed by block 1408, in which at least one promotional reward is credited to the promotional association associated with the beverage dispensed. In the embodiment shown, a processor or controller, such as 106 in FIG. 1, associated with the product dispenser, such as 102A, can transmit an indication to a local and/or remote server or data processing resource, such as 126. In response to receiving the indication from the product dispenser, such as 102A, the local and/or remote server or data processing resource, such as 126, can store data associated with a promotional reward or other reward data in an account associated with the promotional association associated with the product or beverage dispensed. In one embodiment, an account can be generated for a promotional association, and stored in a memory associated with the local and/or remote server or data processing resource, such as 126, or other data storage device, such as 110. Prior to a reward being posted to the account, the consumer or promotional association can select or otherwise designate the account to receive a reward. For example, a processor or controller, such as 106, associated with the product dispenser, such as 102A, can provide an option to a consumer or promotional association via a user interface, such as 112, to select or otherwise designate an account to receive a reward. In another example, a local and/or remote server or data processing resource, such as 126, can provide an option to a consumer or promotional association via a client-type device, such as 214A-214C in FIG. 2, to select or otherwise designate an account to receive a reward. In any instance, rewards can accrue in an account and/or can be redeemed, as may be required and/or desired in a particular embodiment.

The method 1400 ends after block 1408.

In one embodiment, a promotional list of products or beverages can be offered to a consumer. Each of the promotional products or beverages can have a promotional association. In this regard, for example and not a limitation, a beverage can be associated with a school, organization, charity, and/or other types and/or kinds of promotional associations. When a consumer selects the promotional product or beverage the associated promotional association can receive a reward. Such reward might be monetary and/or other types and/or kinds of rewards, as may be required and/or desired by a particular embodiment. This can allow a promotional association to receive rewards each time a consumer elects to dispense their associated beverage from the product dispenser.

In one embodiment, for example and not a limitation a school can have a promotional association with a specific beverage formulation. Each time the dispenser is accessed by a consumer, the consumer can be offered the opportunity to dispense the promotional beverage associated with the school. When the consumer selects the school's promotional beverage, the school receives a reward. Such reward can be points, loyalty, monetary, and/or other types and/or kinds of rewards, as may be required and/or desired in a particular embodiment.

Figure 15:
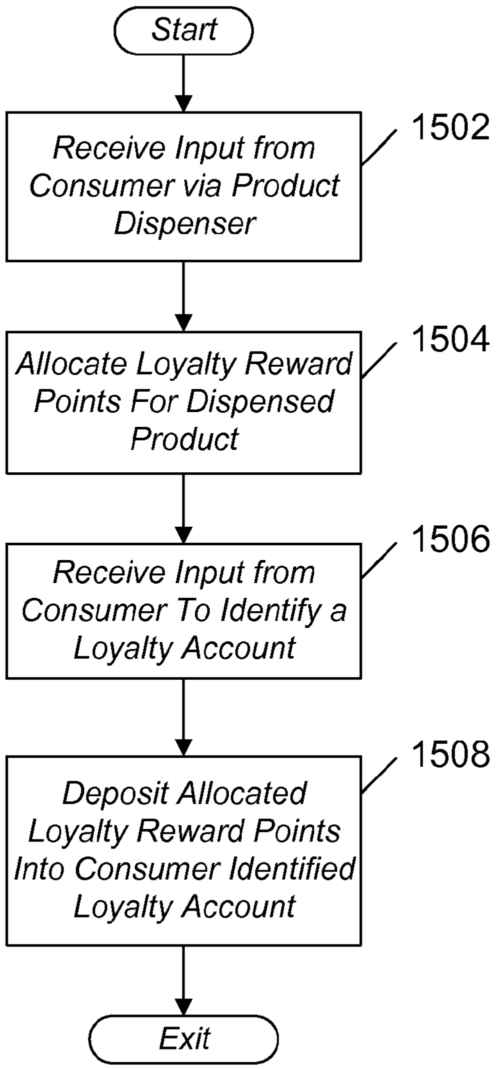
FIG. 15 illustrates one example method of providing consumer benefits by enabling a consumer to receive loyalty rewards when a product or beverage is dispensed from a product dispenser in accordance with an embodiment of the invention.

Referring to FIG. 15, an example method 1500 of providing a consumer with a benefit when a product or beverage is dispensed from a product dispenser is illustrated. In the embodiment shown, a consumer can receive loyalty rewards when they use the product dispenser. In this regard, a MYCOKEREWARDS™ account and/or other types and/or kinds of loyalty accounts can be utilized to accrue and/or redeem loyalty rewards when the consumer utilizes the product dispenser.

The method 1500 begins in block 1502, in which an input is received from a consumer via a product dispenser. In this embodiment, a consumer can be allowed or otherwise provided access and use to a product dispenser, such as 102A in FIG. 1. A consumer can enter data via a user interface, such as 112, associated with the product dispenser, for instance a selection of an indicator corresponding to DIET CHERRY COKE™. In other embodiments, other products or beverages can be selected by a consumer, or other data associated with one or more product or beverage selections can be entered by a consumer.

Block 1502 is followed by block 1504, in which loyalty reward points are allocated for a dispensed product or beverage. In this embodiment, a processor or controller, such as 106 in FIG. 1, associated with a product dispenser, or a server or data processing resource, such as 126, can allocate or otherwise determine one or more loyalty reward points for the dispensing of a product or beverage.

Block 1504 is followed by block 1506, in which the consumer is allowed to identify a loyalty account. In this embodiment, a consumer can identify via a client-type or wireless communication device, such as 214A-214C, at least one loyalty account. An account can be, for example, a MYCOKEREWARDS™ account. For example, using an input device, such as a keypad, associated with a client-type or wireless communication device, a consumer can input an account information, such as an account number, information associated with an account, or otherwise a selected indication of an account associated with the consumer. The client-type or wireless communication device can transmit account or other associated information via a network, such as 104, to a product dispenser, such as 102A, server, or data processing device, such as 126.

Block 1506 is followed by block 1508, in which the allocated loyalty reward points are deposited into the consumer identified loyalty account. In this embodiment, the processor or controller, such as 106, associated with a product dispenser, or a server or data processing resource, such as 126, can deposit or otherwise credit loyalty reward points to a loyalty account identified by a consumer.

The method 1500 ends after block 1508.

Figure 16:
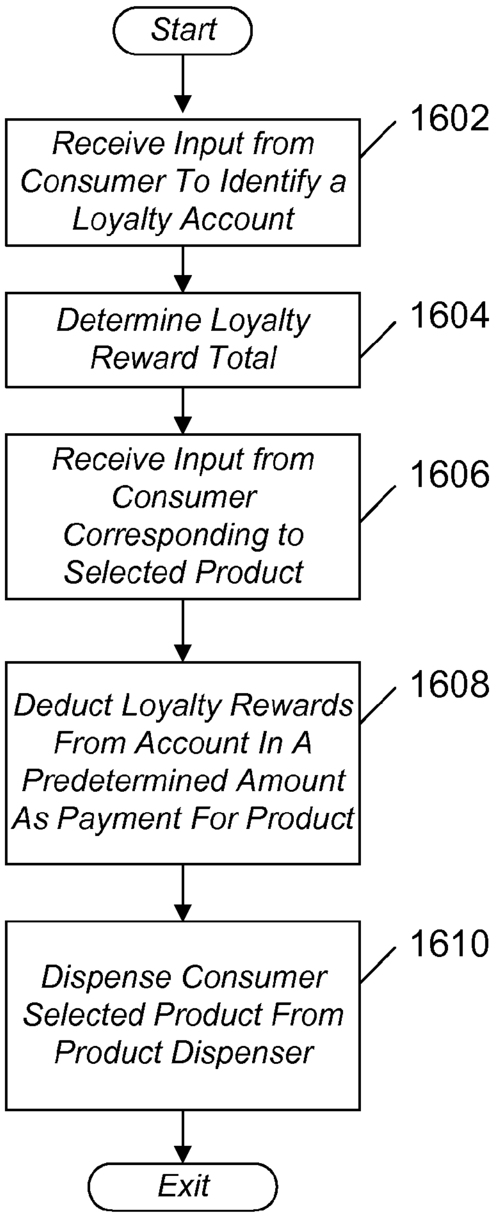
FIG. 16 illustrates one example method of providing consumer benefits by enabling a consumer to redeem loyalty rewards to be used as payment for a product or beverage dispensed from a product dispenser in accordance with an embodiment of the invention.

Referring to FIG. 16, an example method 1600 of permitting a consumer to redeem a reward as payment for a product or beverage dispensed from a product dispenser is illustrated. In the embodiment shown, a consumer can identify a loyalty account, and loyalty reward points can be deducted from the account to pay for a dispensed product or beverage from the product dispenser.

The method 1600 begins in block 1602, in which a consumer is allowed to identify a loyalty account. In this embodiment, a consumer can identify a loyalty account via a client-type or wireless communication device, such as 214A-214C in FIG. 2. For example, a consumer can provide an instruction to select a particular loyalty account, such as inputting or selecting a loyalty account name or number. The instructions can be transmitted via an input device associated with a client-type or wireless communicating device, such as a keypad associated with a client-type or wireless communication device, such as 214A-214C. In another example, a wireless communication device can provide a prompt to a consumer, and a consumer can provide an instruction, such as a voice instruction, to provide an indication of a loyalty account name or number. The instructions can be transmitted via an input device, such as a microphone, associated with a client-type or wireless communication device, such as 214A-214C. In any event, a controller or processor associated with the client-type or wireless communication device can receive the instruction from the consumer and transmit the instruction to a product dispenser, such as 102A in FIG. 1, or to a server or data processing resource, such as 126. A loyalty account can be, for example, a MYCOKEREWARDS™ account.

Block 1602 is followed by block 1604, in which a loyalty reward total is determined. In this embodiment, a processor or controller, such as 106, associated with a product dispenser, or a server or data processing resource, such as 126, can determine a total amount of loyalty reward points in a particular loyalty account identified by a consumer.

Block 1604 is followed by block 1606, in which an input is received from the consumer to select a beverage. In this embodiment, the processor or controller, such as 106, associated with a product dispenser, or a server or data processing resource, such as 126, can provide access, based at least in part on the total amount of loyalty reward points in a particular loyalty account, to one or more beverage selections to a consumer. A consumer can enter data via a user interface, such as 112, associated with the product dispenser, for instance a selection of an indicator corresponding to DIET CHERRY COKE™. In other embodiments, other products or beverages can be selected by a consumer, or other data associated with one or more product or beverage selections can be entered by a consumer.

Block 1606 is followed by block 1608, in which a predetermined amount is deducted from the loyalty reward total as payment for a selected product or beverage. In this embodiment, a processor or controller, such as 106, associated with a product dispenser, or a server or data processing resource, such as 126, can deduct a predetermined amount of loyalty rewards points from a total amount of loyalty reward points in a particular account. In any event, the total amount of loyalty reward points in a particular loyalty account can updated to reflect a deduction of the predetermined amount.

Block 1608 is followed by block 1610, in which the consumer selected product or beverage is dispensed from the product dispenser. In this embodiment, a processor or controller, such as 106, associated with a product dispenser, can facilitate dispensing the consumer selected product or beverage to the consumer.

The method 1600 ends after block 1610.

The capabilities of various embodiments of the invention can be implemented in software, firmware, hardware or some combination thereof.

As one example, one or more aspects of the invention can be included in an article of manufacture (e.g., one or more computer program products) having, for instance, computer usable media. The media has embodied therein, for instance, computer readable program code means for providing and facilitating the capabilities of the embodiment of the invention. The article of manufacture can be included as a part of a computer system or sold separately. One example of a suitable article of manufacture is a consumer interaction engine or module, such as 114 described in FIG. 1.

Additionally, at least one program storage device readable by a machine, tangibly embodying at least one program or set of instructions executable by the machine to perform the capabilities of the embodiment of the invention can be provided. One example of a suitable program storage device readable by machine is a memory or data storage device, such as 110 described in FIG. 1.

The flow diagrams depicted herein are examples. There may be many variations to these diagrams or the elements (or operations) described therein without departing from the scope of the claimed invention. For instance, the elements may be performed in a differing order, or elements may be added, deleted or modified. All of these variations are considered a part of the claimed invention.

While embodiments of the invention have been described, it will be understood that those skilled in the art, both now and in the future, may make various improvements and enhancements which fall within the scope of the claims which follow. These claims should be construed to maintain the proper protection for the invention first described.

The claimed invention is:

1. A system comprising:

a beverage dispenser;

a processor functionally coupled to the beverage dispenser and configured to execute a set of instructions that, in response to execution, cause the processor to:

receive a consumer preference to receive a notification associated with availability of a beverage at the beverage dispenser, wherein the consumer preference comprises a selection of at least one of email communication, text message, voice mail communication, wireline phone call, or mobile phone call;

determine the availability of the beverage at the beverage dispenser; and based at least in part on the consumer preference, notify the consumer that the beverage is available at the beverage dispenser and a location of the beverage dispenser in response to determining that the beverage is available, wherein the consumer is notified via a communication transmitted according to the consumer preference to a device associated with the consumer.

2. The system of claim 1, wherein the consumer preference comprises at least one of consumer data, at least one consumer selection, at least one beverage preference, a preference to receive a notification when the beverage is available, or at least one location preference.

3. The system of claim 1, further comprising a data storage device comprising data from at least one ingredient matrix associated with the beverage dispenser, wherein the processor communicates with the data storage device to determine availability of the beverage at the beverage dispenser.

4. The system of claim 1, wherein the processor is configured to transmit one or more of an e-mail, a message, an online posting via a network, a voice mail, a wireless communication, or a wired communication.

5. The system of claim 1, wherein the controller is further configured to execute a set of instructions that, in response to execution, cause the processor to:

determine availability of an alternative beverage; and based at least in part on the availability of the alternative beverage, notify the consumer regarding the availability of the alternative beverage.

6. The system of claim 1, wherein the beverage comprises a new beverage formulation, and the consumer preference comprises a preference to be notified in response to the new beverage formulation being available.

7. A system comprising:

a beverage dispenser;

a processor functionally coupled to the beverage dispenser and configured to execute a set of instructions that, in response to execution, cause the processor to:

receive selection data from a consumer, wherein the selection data comprises a consumer preference for communication;

based at least in part on the selection data, determine at least one notification of availability of a beverage at the beverage dispenser to transmit to the consumer; and in response to determining that the beverage is available, transmit a notification of the at least one notification of availability to the consumer regarding availability of the beverage from the beverage dispenser and a location of the beverage dispenser, wherein the notification is transmitted according to the consumer preference for communication via a communication to a device associated with the consumer.

8. The system of claim 7, wherein selection data further comprises at least one of a brand name of a beverage, a type of beverage, a promotion, a type of user interface associated with a beverage dispenser, a health interest, a location of interest, or a beverage attribute.

9. The system of claim 7, wherein a notification to the consumer comprises transmitting at least one of an e-mail communication, a message, an online posting via a network, an output via a user interface, an output via a user interface associated with the beverage dispenser, a communication via a client-type device, a communication via a wireless communication device, voice mail, wireless communication, or wired communication.

10. The system of claim 7, wherein the notification comprises data indicative of at least one of a beverage, a beverage location, an alternative beverage, an alternative location, availability of a selected beverage, a time or date for availability of a selected beverage, an enhanced user interface, a classic type user interface, a promotion, promotion information, a coupon, product information, beverage information, a ring tone, a game code, health information, or consumer interest information.

11. The system of claim 7, wherein the processor is further configured to execute a set of instructions that, in response to execution, cause the processor to add a transaction charge for some or all content provided to the consumer.

12. A method of supplying product availability, comprising:

receiving a consumer preference to receive a notification associated with availability of a beverage, wherein the consumer preference comprises a selection of at least one of email communication, text message, voice mail communication, wireline phone call, or mobile phone call;

determining the availability of the beverage at a beverage dispenser; and based at least in part on the consumer preference, notifying the consumer that the beverage is available and a location of the beverage dispenser in response to determining that the beverage is available, wherein the consumer is notified via a communication transmitted according to the consumer preference to a device associated with the consumer.

13. The method of claim 12, wherein the consumer preference comprises at least one of consumer data, at least one consumer selection, at least one beverage preference, a preference to receive a notification when the beverage is available, or at least one location preference.

14. The method of claim 12, wherein determining the availability of the beverage at the beverage dispenser comprises querying a data storage device comprising data from at least one ingredient matrix associated with a beverage dispenser.

15. The method of claim 12, wherein notifying the consumer that the beverage is available comprises transmitting at least one of an e-mail communication, a message, an online posting via a network, voice mail, a wireless communication, or a wired communication.

16. The method of claim 12, further comprises:

determining whether an alternative beverage is available; and based at least in part on the availability of the alternative beverage, notifying the consumer regarding availability of the alternative beverage.

17. The method of claim 12, wherein the beverage comprises a new beverage formulation, and the consumer preference is to be notified in response to the new beverage formulation being available.

18. A method of interacting with a consumer, comprising:

receiving selection data from a consumer, wherein the selection data comprises data indicative of a consumer preference for communicating via at least one of email communication, text message, voice mail communication, wireline phone call, or mobile phone call;

based at least in part on the selection data, determining at least one notification of availability of a beverage to transmit to the consumer; and transmitting a notification of the availability of the beverage to the consumer via a device associated with the consumer according to the consumer preference.

19. The method of claim 18, wherein selection data comprises at least one of a brand name of the beverage, a type of the beverage, a promotion, a type of user interface associated with a beverage dispenser, a health interest, a location of interest, or a beverage attribute of the beverage.

20. The method of claim 18, wherein transmitting a notification to the consumer comprises transmitting at least one of an e-mail message, a message, an online posting via a network, an output via a user interface, an output via a user interface associated with the beverage dispenser, a communication via a client-type device, a communication via a wireless communication device, a voice mail message, a wireless communication, or a wired communication.

21. The method of claim 18, wherein the notification comprises information indicative of at least one of a beverage, a beverage location, an alternative beverage, an alternative location, availability of a selected beverage, a time or date for availability of a selected beverage, an enhanced user interface, a classic type user interface, a promotion, promotion information, a coupon, beverage information, a ring tone, a game code, health information, or consumer interest information.

22. The method of claim 18, further comprising adding a transaction charge for some or all content provided to the consumer.

23. A method for marketing, comprising:

receiving a plurality of consumer preferences from a respective plurality of consumers, wherein at least one consumer preference of the plurality of consumer preferences is indicative of a preference to receive a notification of availability of a beverage formulation, and wherein the at least one consumer preferences comprises a selection for communication via at least one of email communication, text message, voice mail communication, wireline phone call, or mobile phone call;

notifying at least a portion of the plurality of consumers via respective communications transmitted to respective devices associated with the portion of the plurality of consumers that the beverage formulation is scheduled to be released at a predefined time, wherein each of the respective devices is configured to receive at least one of an email communication, a text message, a voice mail communication, a wireline phone call, or a mobile phone call; and authorizing a plurality of beverage dispensers to dispense the beverage formulation at the predefined time.

* * * * *